US008655098B2

United States Patent
On

(10) Patent No.: US 8,655,098 B2
(45) Date of Patent: Feb. 18, 2014

(54) IMAGE SIGNAL PROCESSING APPARATUS AND COMPUTER-READABLE RECORDING MEDIUM RECORDING IMAGE SIGNAL PROCESSING PROGRAM

(75) Inventor: Seigo On, Hachioji (JP)

(73) Assignee: Olympus Corporation (JP)

( * ) Notice: Subject to any disclaimer, the term of this patent is extended or adjusted under 35 U.S.C. 154(b) by 1195 days.

(21) Appl. No.: 12/557,096

(22) Filed: Sep. 10, 2009

(65) Prior Publication Data

US 2009/0323093 A1 Dec. 31, 2009

Related U.S. Application Data

(63) Continuation of application No. PCT/JP2007/054983, filed on Mar. 13, 2007.

(51) Int. Cl.
*G06K 9/40* (2006.01)
(52) U.S. Cl.
USPC .......................................................... 382/274
(58) Field of Classification Search
USPC .................. 382/100, 254, 274; 250/205–207; 345/20, 63, 77, 581–618, 690–697; 348/251–254; 358/461–463
See application file for complete search history.

(56) References Cited

U.S. PATENT DOCUMENTS

| 2005/0162360 A1* | 7/2005 | Ishihara et al. ................. 345/89 |
| 2006/0062562 A1 | 3/2006 | Utagawa ....................... 396/213 |
| 2006/0158529 A1* | 7/2006 | Katagiri ...................... 348/222.1 |

FOREIGN PATENT DOCUMENTS

| EP | 1 638 312 | 3/2006 |
| JP | 05-064075 | 3/1993 |
| JP | 3465226 | 8/2003 |
| JP | 2004-061930 | 2/2004 |
| JP | 2005-303802 | 10/2005 |
| JP | 2006-114006 | 4/2006 |
| JP | 2006-295582 | 10/2006 |
| WO | WO 2005/099355 | 10/2005 |
| WO | WO 2006/025486 | 3/2006 |

OTHER PUBLICATIONS

International Search Report mailed Apr. 24, 2007 in corresponding PCT International Application No. PCT/JP2007/054983.

* cited by examiner

*Primary Examiner* — Atiba O Fitzpatrick
(74) *Attorney, Agent, or Firm* — Ostrolenk Faber LLP

(57) ABSTRACT

An image signal processing apparatus including a first tone correcting section for generating a first image signal by performing a space-variant tone conversion process for a digitalized image signal from a CCD and an A/D converting section, a second tone correcting section for generating a second image signal by performing a space-invariant tone correction process for the digitalized image signal from the CCD and the A/D converting section, and a synthesizing section for setting a synthesis rate R1 of the first image signal and a synthesis rate R2 of the second image signal, and synthesizing the first image signal and the second image signal based on the set synthesis rates R1 and R2.

22 Claims, 18 Drawing Sheets

IMAGE SIGNAL PROCESSING APPARATUS AND COMPUTER-READABLE RECORDING MEDIUM RECORDING IMAGE SIGNAL PROCESSING PROGRAM

CROSS REFERENCE TO RELATED APPLICATION

This application is a continuation application of PCT/JP2007/054983 filed on Mar. 13, 2007, the entire contents of which are incorporate herein by this reference.

BACKGROUND OF THE INVENTION

1. Field of the Invention

The present invention relates to an image signal processing apparatus and a computer-readable recording medium recording an image signal processing program for performing an image signal process for a digitalized image signal from an image pickup device.

2. Description of the Related Art

Various image signal processes, one of which is a tone conversion process, are performed for an image signal.

If the image signal is a digitalized signal, the tone conversion process includes a process in which the number of bits varies between before and after the conversion, and a process in which the number of bits does not vary. Among the processes, for example, in the process in which the number of bits does not vary, if tone conversion is performed, a luminance region of which a tone width is extended, and a luminance region of which the tone width is compressed occur. Then, in the luminance region of which the tone width is compressed, a tone property is degraded. Particularly, whiteout occurs in a high luminance region, or blackout occurs in a low luminance region, which has been a problem in terms of image quality.

In response to such a problem, for example, Japanese Patent Application Laid-Open Publication No. 5-64075 describes a technique for obtaining a plurality of images with different exposure amounts with respect to the same shooting scene, and replacing a high luminance region in an image with a large exposure amount, with a corresponding region in an image with a small exposure amount, or a technique for replacing a low luminance region in the image with the small exposure amount, with a corresponding region in the image with the large exposure amount. In addition, usage of such techniques enables to suppress the occurrence of the region with the whiteout or the region with the blackout, and improve the image quality.

Moreover, for example, as an example of a space-variant tone conversion technique, Japanese Patent No. 3465226 describes a technique for analyzing a texture of an image, dividing the image into a plurality of regions based on a result of the analysis, and performing the tone conversion by using an independent tone characteristic for each region. Thereby, even in a scene with a large light-dark ratio, the region with the whiteout or the blackout can be suppressed well.

Incidentally, Japanese Patent Application Laid-Open Publication No. 2005-303802 describes a technique for estimating a noise amount, and performing a noise reduction process based on the estimated noise amount. The noise amount estimation technique described in the above described publication does not only estimate the noise amount based on a signal level, but also, further performs the estimation for each color signal based on an ISO sensitivity which dynamically varies for each shooting.

SUMMARY OF THE INVENTION

An image signal processing apparatus according to the present invention is an image signal processing apparatus for performing an image signal process for a digitalized image signal from an image pickup device, including first tone conversion processing means for generating a first image signal by performing a space-variant tone conversion process for the image signal, second tone conversion processing means for generating a second image signal by performing a space-invariant tone correction process for the image signal, and synthesizing means for synthesizing the first image signal and the second image signal.

Moreover, a computer-readable recording medium recording an image signal processing program according to the present invention is a recording medium recording an image signal processing program for performing an image signal process for a digitalized image signal from an image pickup device, the image signal processing program including a first tone conversion processing step of generating a first image signal by performing a space-variant tone conversion process for the image signal, a second tone conversion processing step of generating a second image signal by performing a space-invariant tone correction process for the image signal, and a synthesizing step of synthesizing the first image signal and the second image signal.

DETAILED DESCRIPTION OF THE PREFERRED EMBODIMENTS

Hereinafter, embodiments of the present invention will be described with reference to the drawings.

Embodiment 1

Figure 1:
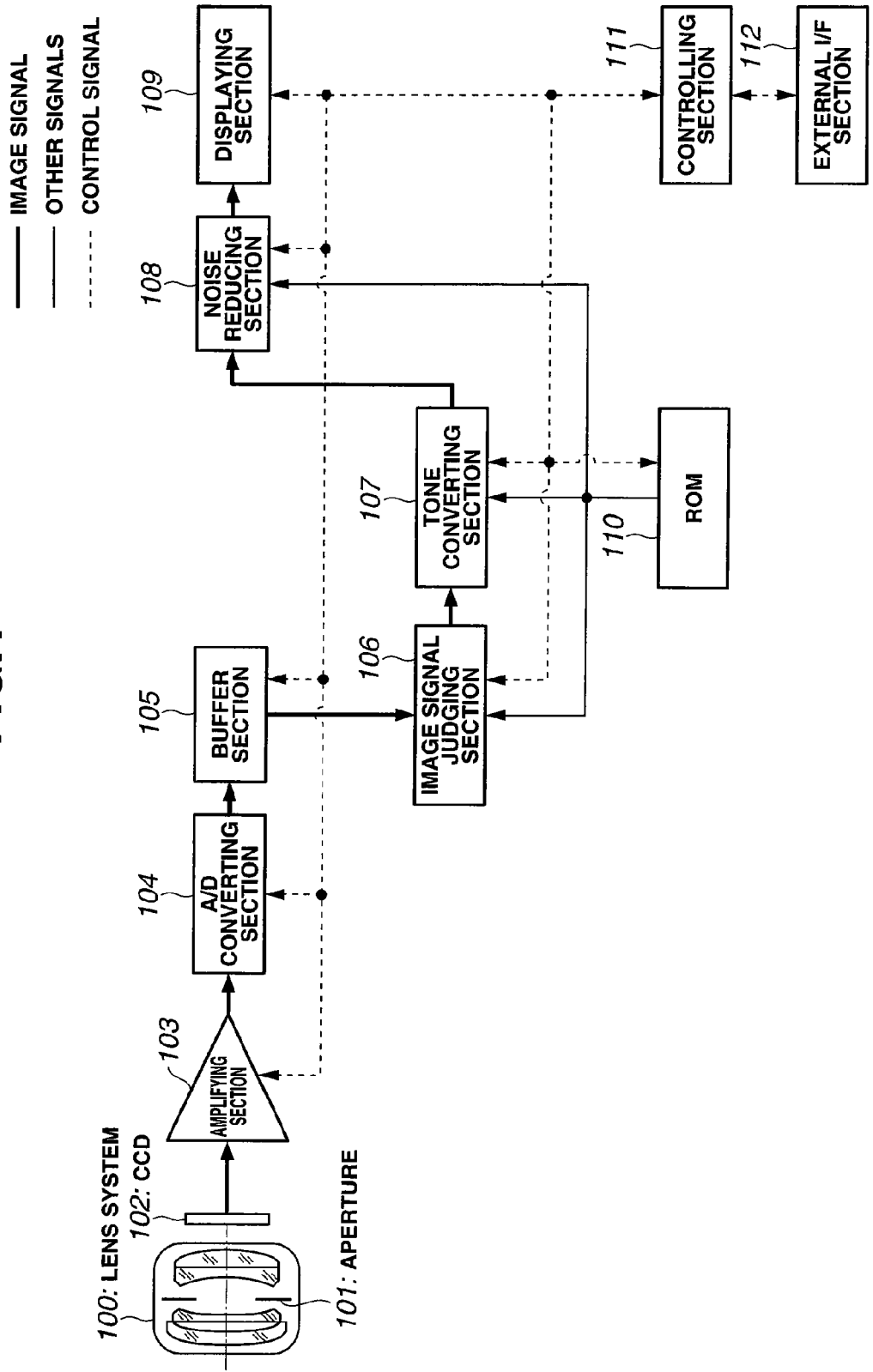
FIG. 1 is a block diagram showing a configuration of an image signal processing apparatus in Embodiment 1 of the present invention.

FIGS. 1 to 12 show Embodiment 1 of the present invention. FIG. 1 is a block diagram showing a configuration of an image signal processing apparatus.

The image signal processing apparatus is configured to have a lens system 100, an aperture 101, a CCD 102 which is an image pickup device, an amplifying section 103, an A/D converting section 104, a buffer section 105, an image signal judging section 106, a tone converting section 107, a noise reducing section 108 which is image quality degradation information obtaining means and image quality correcting means, a displaying section 109, a ROM 110, a controlling section 111, and an external I/F section 112 which is threshold setting means and threshold inputting means. In other words, the image signal processing apparatus of the present embodiment is configured as an image pickup apparatus including an image pickup section with the lens system 100, the aperture 101, the CCD 102, the amplifying section 103, the A/D converting section 104 and the like.

An analog image signal which has been shot and outputted via the lens system 100, the aperture 101 and the CCD 102 is amplified by the amplifying section 103. The analog image signal amplified by the amplifying section 103 is converted into a digital signal by the A/D converting section 104, and transferred to the buffer section 105.

The buffer section 105 is connected to the displaying section 109 via the image signal judging section 106, the tone converting section 107, and the noise reducing section 108.

The ROM 110 is connected to the image signal judging section 106, the tone converting section 107, and the noise reducing section 108.

The controlling section 111 is configured with, for example, a microcomputer or the like, and is bidirectionally connected to the amplifying section 103, the A/D converting section 104, the buffer section 105, the image signal judging section 106, the tone converting section 107, the noise reducing section 108, the displaying section 109, the ROM 110, and the external I/F section 112, so as to control the sections.

Here, the external I/F section 112 is an interface including a power switch, a shutter button and the like.

Next, an operation of the image signal processing apparatus as shown in FIG. 1 will be described along a flow of the image signal.

When the shutter button is depressed via the external I/F section 112, the image signal processing apparatus which is the image pickup apparatus performs various processes related to shooting as described below.

The lens system 100 forms an optical image of a subject on an image pickup surface of the CCD 102.

The aperture 101 changes brightness of the optical image formed on the image pickup surface of the CCD 102, by defining a passing range of a subject light flux image-formed by the lens system 100.

The CCD 102 photoelectrically converts the formed optical image, and outputs the image as the analog image signal. The analog image signal outputted then is a signal for which known correlated double sampling or the like has been performed.

It should be noted that, in the present embodiment, a single CCD with a Bayer-type primary color filter arranged on a front face is assumed as the CCD 102. Therefore, under the assumption, the image signal outputted from the CCD 102 becomes a color image signal including three components of R (Red), G (Green) and B (Blue).

The amplifying section 103 amplifies the analog image signal from the CCD 102, based on control by the controlling section 111.

The A/D converting section 104 converts the analog image signal amplified by the amplifying section 103, into the digital image signal, and transfers the digital image signal to the buffer section 105.

The buffer section 105 stores the image signal transferred from the A/D converting section 104.

The image signal judging section 106 reads a threshold (high luminance threshold) for determining whether or not the image signal is a high luminance image signal, from the ROM 110. Then, based on the read high luminance threshold, the image signal judging section 106 determines whether or not the high luminance image signal exists in the image signal transferred from the buffer section 105, and generates a high luminance determination result.

Then, the image signal judging section 106 transfers the high luminance determination result and the image signal to the tone converting section 107 (it should be noted that, in FIG. 1 and other respective block diagrams, although a signal denoted by a thick solid line includes at least an image signal, the signal may also include a signal other than the image signal.).

Based on the transferred high luminance determination result, the tone converting section 107 performs a tone conversion process corresponding to the image signal, for the above described image signal, and transfers the processed image signal to the noise reducing section 108.

The noise reducing section 108 performs a noise reduction process for the transferred image signal, and transfers the processed image signal to the displaying section 109.

The displaying section 109 performs display based on the transferred image signal.

Figure 2:
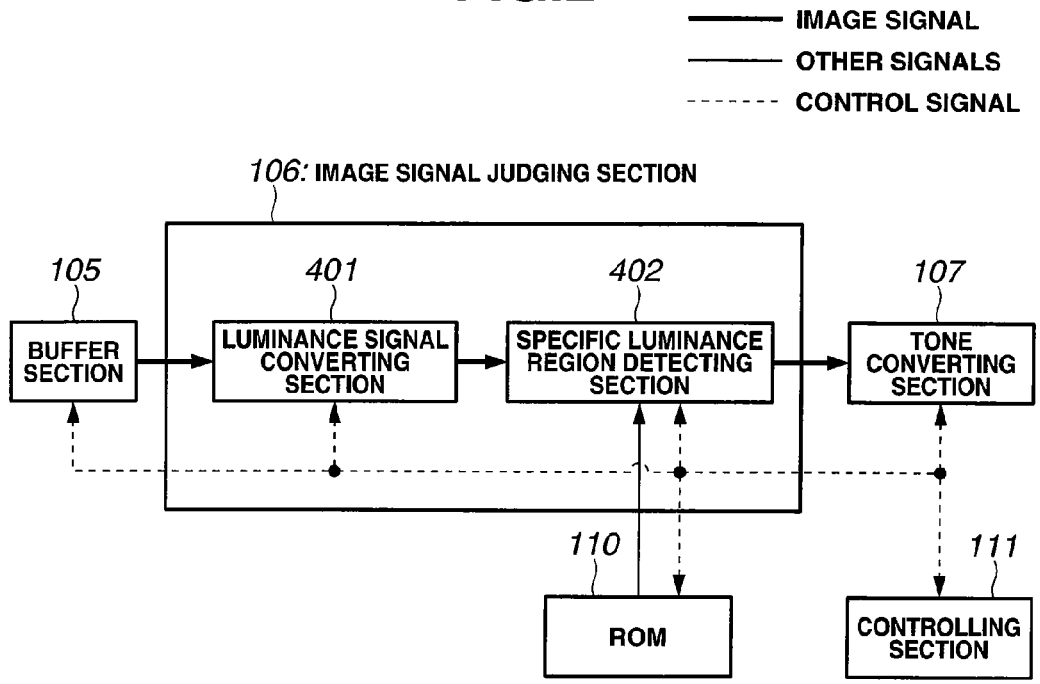
FIG. 2 is a block diagram showing an example of a configuration of an image signal judging section in the above described Embodiment 1.

Next, FIG. 2 is a block diagram showing an example of a configuration of the image signal judging section 106.

The image signal judging section 106 is configured to have a luminance signal converting section 401, and a specific luminance region detecting section 402 which is synthesis rate setting means.

The buffer section 105 is connected to the tone converting section 107 via the luminance signal converting section 401 and the specific luminance region detecting section 402. The ROM 110 is connected to the specific luminance region detecting section 402. The controlling section 111 is bidirectionally connected to the luminance signal converting section 401 and the specific luminance region detecting section 402, so as to control the sections.

In the present embodiment, based on an RGB image signal (Rij: R signal, Gij: G signal, and Bij: B signal) at a pixel position (i, j) (here, i denotes a coordinate value in a lateral direction of the image signal, and j denotes a coordinate value in a longitudinal direction of the image signal, respectively.) which is transferred in units of pixels from the buffer section 105, the luminance signal converting section 401 calculates a luminance value Kij for each pixel as shown in the following Equation 1.

$$Kij = A1 \times Rij + A2 \times Gij + A3 \times Bij$$ [Equation 1]

Here, A1, A2 and A3 are predetermined constants by which the R signal Rij, the G signal Gij, and the B signal Bij are multiplied respectively, when the luminance value Kij is calculated.

Next, the specific luminance region detecting section 402 reads the high luminance threshold for judging the high luminance image signal, from the ROM 110, and compares the read high luminance threshold with the luminance value Kij transferred in units of pixels from the buffer section 105. If the luminance value Kij is larger than the high luminance threshold, the specific luminance region detecting section 402 judges that the image signal of the above described pixel is the high luminance image signal. The specific luminance region detecting section 402 performs such comparison for all the pixels included in the image, and counts the number of pixels judged as the high luminance image signal. Then, the specific luminance region detecting section 402 compares a value of a counter after all the pixels have been processed, with a predetermined threshold read from the ROM 110. If the counter value is larger than the predetermined threshold, the high luminance determination result is that the high luminance image signal exists in the image. If the counter value is less than or equal to the predetermined threshold, the high luminance determination result is that the high luminance image signal does not exist in the image.

Subsequently, the specific luminance region detecting section 402 transfers the high luminance determination result and the image signal to the tone converting section 107.

It should be noted that, in the above description, the high luminance threshold for judging the high luminance image signal has been previously stored in the ROM 110, and the specific luminance region detecting section 402 has read and used the high luminance threshold from the ROM 110, which, however, is not restrictive, and the high luminance threshold may be able to be designated. Here, examples of means for designating the high luminance threshold include means for manually setting by a user via the external I/F section 112, and means for automatically setting based on a γ characteristic or the like of a displaying apparatus included in the displaying section 109.

Here, as the means for manually setting, the user may manually set a desired high luminance threshold via the external I/F section 112, or the means for manually setting may be means for previously preparing a plurality of high luminance thresholds in the ROM 110 and designating any one of the high luminance thresholds by the user via the external I/F section 112.

Moreover, if the means for automatically setting the high luminance threshold is employed, it is conceivable that the specific luminance region detecting section 402 is configured as shown in the following FIG. 5.

Figure 5:
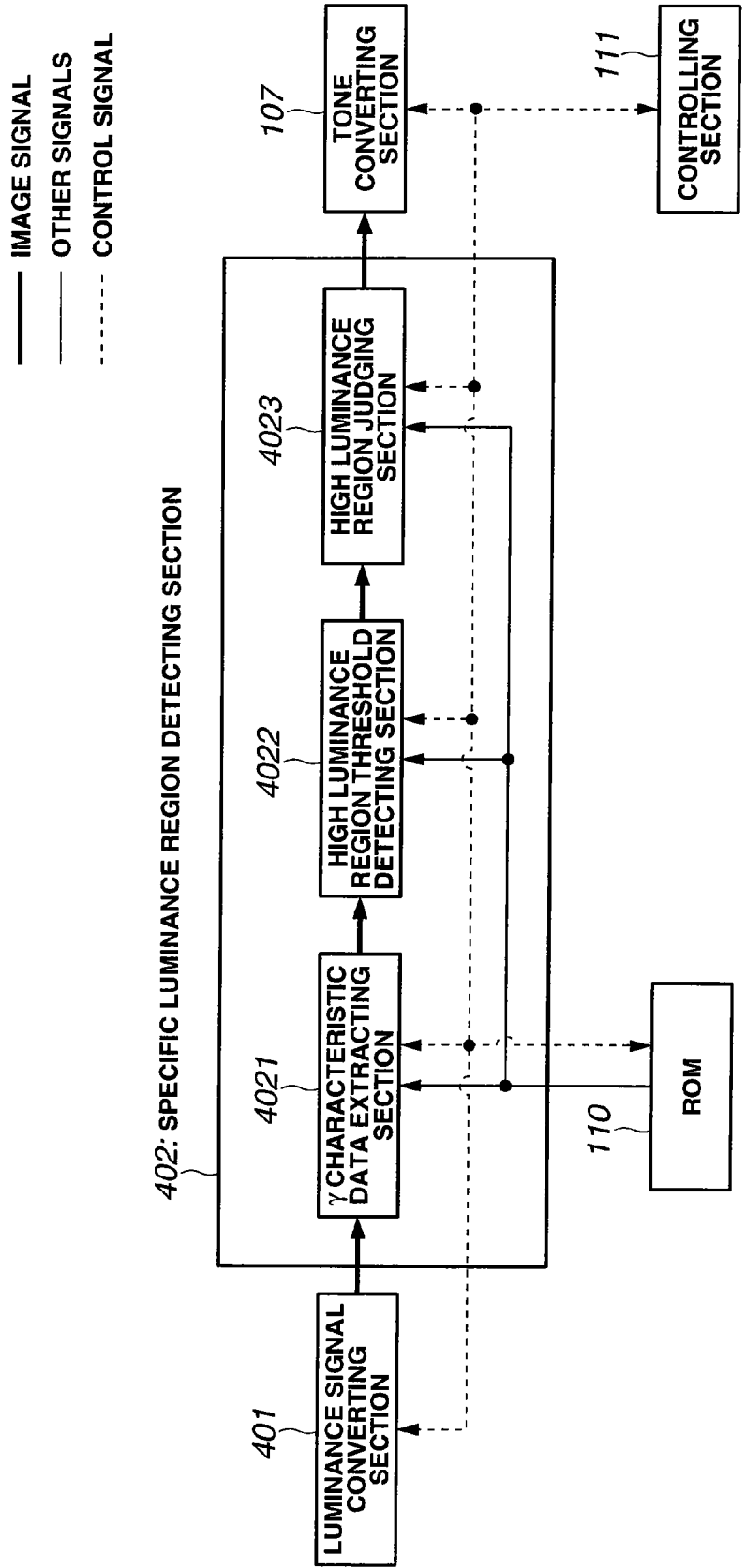
FIG. 5 is a block diagram showing an example of a configuration of a specific luminance region detecting section in the above described Embodiment 1.

FIG. 5 is a block diagram showing an example of a configuration of the specific luminance region detecting section 402.

The specific luminance region detecting section 402 is configured to have a γ (gamma) characteristic data extracting section 4021, a high luminance region threshold detecting section 4022 which is the threshold setting means, and a high luminance region judging section 4023 which is specific luminance region detecting means.

The luminance signal converting section 401 is connected to the tone converting section 107 via the γ characteristic data extracting section 4021, the high luminance region threshold detecting section 4022, and the high luminance region judging section 4023. The ROM 110 is connected to the γ characteristic data extracting section 4021, the high luminance region threshold detecting section 4022, and the high luminance region judging section 4023. The controlling section 111 is bidirectionally connected to the γ characteristic data extracting section 4021, the high luminance region threshold detecting section 4022, and the high luminance region judging section 4023, so as to control the sections.

Moreover, it is assumed that the ROM 110 has previously stored a plurality of kinds of γ characteristic data.

Figure 3:
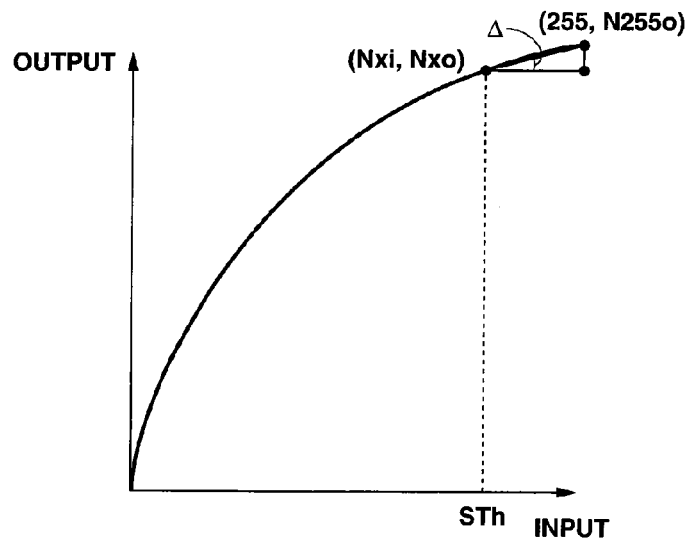
FIG. 3 is a diagram showing γ characteristic data in the above described Embodiment 1.

When space-invariant tone conversion is performed, a phenomenon may occur in which an image signal without whiteout before the conversion includes the whiteout after the conversion. A cause thereof is that, for example, if a tone conversion curve (γ characteristic data) as shown in FIG. 3 to be described later is used, since a gradient of the γ characteristic data in a high luminance region is almost horizontal, when the image signal in the above described high luminance region is applied with the tone conversion, a variation in light and shade is almost lost after the conversion. Consequently, if a portion with a small slope on the tone conversion curve is detected, the high luminance threshold can be automatically designated.

An operation of the specific luminance region detecting section 402 shown in FIG. 5, based on such a principle, will be described with reference to FIG. 3. Here, FIG. 3 is a diagram showing the γ characteristic data.

First, based on the control by the controlling section 111, the γ characteristic data extracting section 4021 extracts γ characteristic data corresponding to a predetermined displaying apparatus included in the displaying section 109, from the ROM 110. Then, the γ characteristic data extracting section 4021 transfers the extracted γ characteristic data, and the luminance value Kij from the luminance signal converting section 401, to the high luminance region threshold detecting section 4022.

Next, the high luminance region threshold detecting section 4022 reads a predetermined angle ΔTH determined as the whiteout, from the ROM 110. Then, based on the γ characteristic data from the γ characteristic data extracting section 4021 and the angle ΔTH read from the ROM 110, the high luminance region threshold detecting section 4022 calculates a slope angle Δ at a point of interest as described next.

Here, for example, if the tone conversion from an 8-bit (256 tones) image signal into the 8-bit image signal is performed, the γ characteristic data corresponding to the displaying apparatus becomes data with 256 points corresponding to input levels of 0 to 255. It should be noted that output levels are also 0 to 255, similarly to the input levels.

Now, an x-th input level counted in ascending order is set as Nxi, an output level corresponding to the input level Nxi is set as Nxo, and (Nxi, Nxo) is set as the point of interest. Furthermore, an output level corresponding to a maximum input level 255 is set as N255o, and (255, N255o) is set as a maximum point.

Then, while the point of interest is moved in ascending order of the input level, the slope angle Δ of a line going through the point of interest and the maximum point is calculated as shown in the following Equation 2.

$$\Delta = \arctan\{(N255o - Nxo)/(255 - Nxi)\} \quad \text{[Equation 2]}$$

Then, the input level of the point of interest at the time when the slope angle Δ (Equation 2) calculated in the order according to the movement of the point of interest has first become smaller than the predetermined angle ΔTH read from the ROM 110 is set as a high luminance threshold STh.

Subsequently, the high luminance region threshold detecting section 4022 transfers the detected high luminance threshold STh, and the luminance value Kij transferred via the γ characteristic data extracting section 4021, to the high luminance region judging section 4023.

The high luminance region judging section 4023 compares the luminance value Kij transferred in units of pixels, with the transferred high luminance threshold STh. If the luminance value Kij is larger than the high luminance threshold STh, it is judged that the image signal of the above described pixel is the high luminance image signal.

The high luminance region judging section 4023 performs such comparison for all the pixels included in the image, and counts the number of pixels judged as the high luminance image signal. Then, the specific luminance region detecting section 402 compares the value of the counter after all the pixels have been processed, with the predetermined threshold read from the ROM 110. If the counter value is larger than the predetermined threshold, the high luminance determination result is that the high luminance image signal exists in the image. If the counter value is less than or equal to the predetermined threshold, the high luminance determination result is that the high luminance image signal does not exist in the image.

Subsequently, the high luminance region judging section 4023 transfers the high luminance determination result, and the image signal transferred sequentially via the luminance signal converting section 401, the γ characteristic data extracting section 4021, and the high luminance region threshold detecting section 4022, to the tone converting section 107. Furthermore, the high luminance region judging section 4023 also transfers the high luminance threshold STh to the tone converting section 107, as necessary.

It should be noted that information on the slope Δ composed of the above described each input level and each output level, corresponding to the γ characteristic data, may be saved in the ROM 110 in advance, and when the threshold is automatically designated, each slope Δ information may be read in ascending order from the ROM 110, and if a slope smaller than an angle recognized as the whiteout has appeared first, an inputted value corresponding to the slope Δ may be set as the threshold.

Moreover, it is also possible to have a configuration in which the thresholds depending on the γ characteristic data corresponding to different displaying apparatuses have been saved in the ROM 110 in advance, and when the image signal is processed, the threshold depending on the γ characteristic data corresponding to the predetermined displaying apparatus is extracted.

Figure 6:
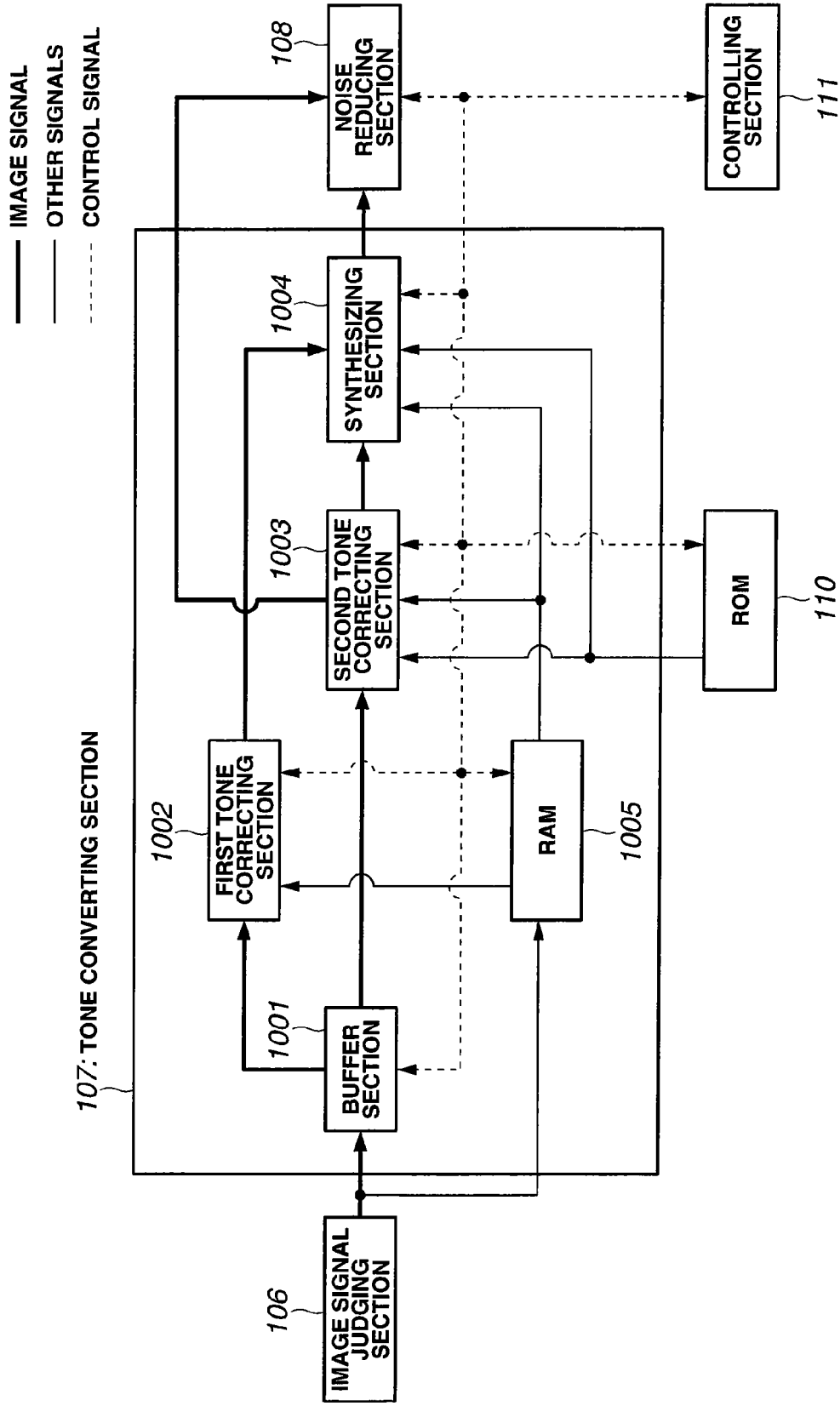
FIG. 6 is a block diagram showing an example of a configuration of a tone converting section in the above described Embodiment 1.

Next, FIG. 6 is a block diagram showing an example of a configuration of the tone converting section 107.

The tone converting section 107 is configured to have a buffer section 1001, a first tone correcting section 1002 which is first tone conversion processing means, a second tone correcting section 1003 which is second tone conversion processing means, a synthesizing section 1004 which is synthesizing means, and a RAM 1005.

The image signal judging section 106 is connected to the buffer section 1001 and the RAM 1005. The buffer section 1001 is connected to the first tone correcting section 1002 and the second tone correcting section 1003. The first tone correcting section 1002 and the second tone correcting section 1003 are connected to the synthesizing section 1004. The second tone correcting section 1003 and the synthesizing section 1004 are connected to the noise reducing section 108. The RAM 1005 is connected to the first tone correcting section 1002, the second tone correcting section 1003, and the synthesizing section 1004. The ROM 110 is connected to the second tone correcting section 1003 and the synthesizing section 1004.

The controlling section 111 is bidirectionally connected to the buffer section 1001, the first tone correcting section 1002, the second tone correcting section 1003, the synthesizing section 1004, and the RAM 1005, so as to control the sections.

The image signal from the image signal judging section 106 is saved in the buffer section 1001, and the high luminance determination result from the image signal judging section 106 is saved in the RAM 1005, respectively. Moreover, if the high luminance threshold STh has been transferred from the image signal judging section 106, the high luminance threshold STh is also saved in the RAM 1005.

The tone converting section 107 extracts the high luminance determination result from the RAM 1005, and determines whether or not the high luminance image signal exists, based on the control by the controlling section 111. Then, if the tone converting section 107 has determined that the high luminance image signal exists, the tone converting section 107 transfers the image signal within the buffer section 1001 to the first tone correcting section 1002 and the second tone correcting section 1003, based on the control by the controlling section 111. On the other hand, if the tone converting section 107 has determined that the high luminance image signal does not exist, the tone converting section 107 transfers the image signal within the buffer section 1001 only to the second tone correcting section 1003, based on the control by the controlling section 111.

As a specific process, for example, the first tone correcting section 1002 performs such a space-variant tone conversion process as described in the above described Japanese Patent No. 3465226. It should be noted that the space-variant tone conversion process means a process for deciding a tone conversion characteristic for each pixel or for each region (which, hereinafter, may be collectively referred to as "for each zone") of a processing target image, and performing the tone conversion for each zone by using the tone conversion characteristic decided for each zone. In the present embodiment, the first tone correcting section 1002 performs the space-variant tone conversion process according to such an approach as will be specifically described next.

In other words, the first tone correcting section 1002 first creates a luminance histogram for each zone. Next, the first tone correcting section 1002 decides a clip value for deciding a degree of smoothing of the luminance histogram, and based on the clip value, clips the above described luminance histogram, and further creates a cumulative histogram from the clipped luminance histogram. Finally, the first tone correcting section 1002 regards the cumulative histogram as a tone conversion curve representing the tone conversion characteristic, and creates tone conversion data based on the tone conversion curve. Then, for each zone of the inputted image signal, the tone conversion process is performed by using the tone conversion data of each zone. Subsequently, the first tone correcting section 1002 transfers the image signal after the tone conversion process, to the synthesizing section 1004.

Moreover, the second tone correcting section 1003 extracts the γ characteristic data corresponding to the displaying apparatus in the displaying section 109, from the ROM 110, and performs a space-invariant tone conversion process for the image signal transferred from the buffer section 1001. It should be noted that the space-invariant tone conversion process means a process, for the processing target image, for performing the tone conversion for the image by using a fixed tone conversion characteristic independent of the zone, without deciding the tone conversion characteristic for each zone. The second tone correcting section 1003 transfers the processed image signal to the synthesizing section 1004 if the high luminance image signal exists, and transfers the processed image signal to the noise reducing section 108 if the high luminance image signal does not exist, based on the control by the controlling section 111.

The synthesizing section 1004 performs an image synthesis process by using a space-variant tone-converted image transferred from the first tone correcting section 1002 and a space-invariant tone-converted image transferred from the second tone correcting section 1003, and transfers a synthesized image signal to the noise reducing section 108.

Figure 7:
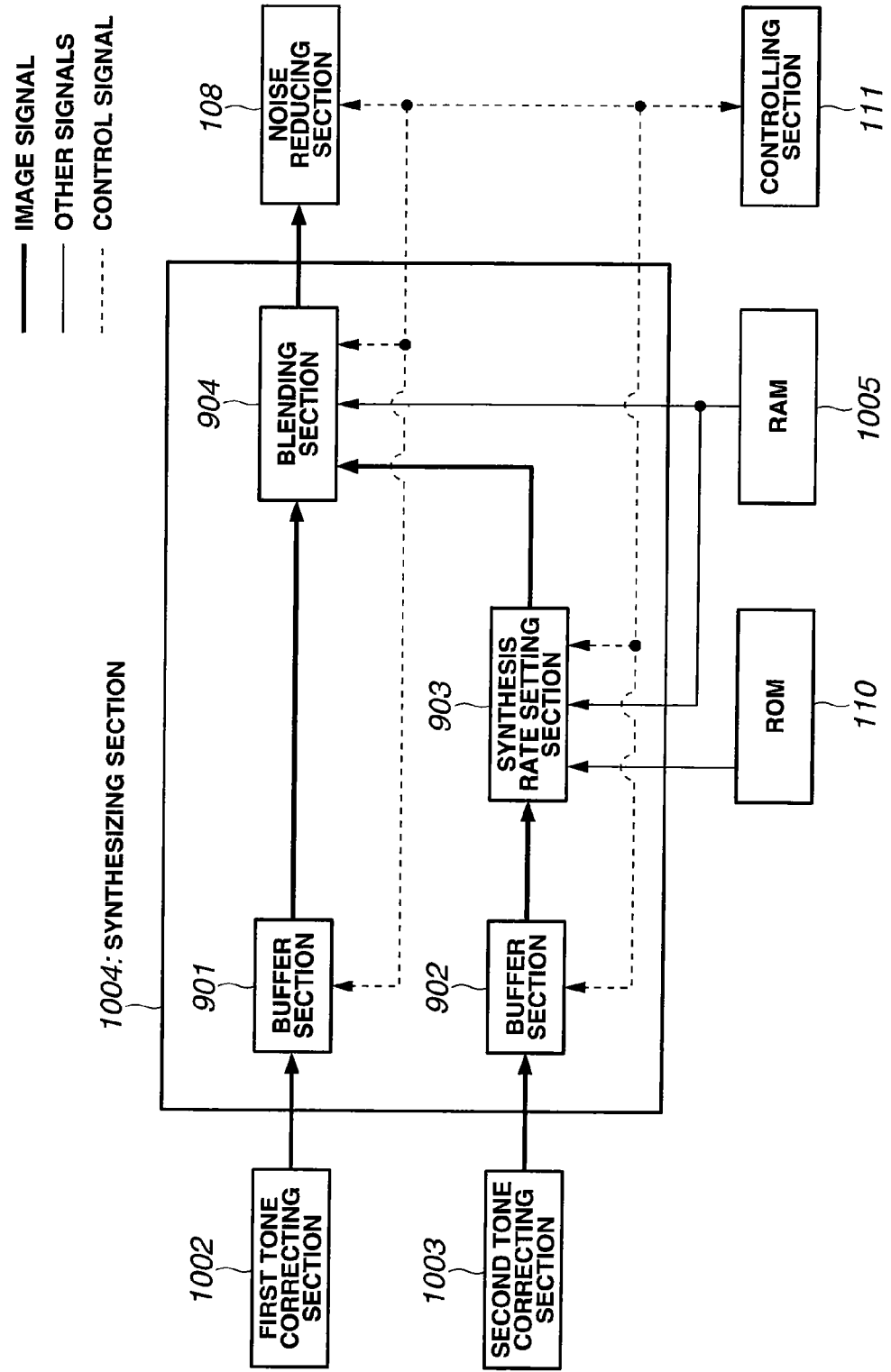
FIG. 7 is a block diagram showing an example of a configuration of a synthesizing section in the above described Embodiment 1.

FIG. 7 is a block diagram showing an example of a configuration of the synthesizing section 1004.

The synthesizing section 1004 is configured to have a buffer section 901, a buffer section 902, a synthesis rate setting section 903 which is the synthesis rate setting means and synthesis rate calculating means, and a blending section 904.

The first tone correcting section 1002 is connected to the blending section 904 via the buffer section 901. The second tone correcting section 1003 is connected to the blending section 904 via the buffer section 902 and the synthesis rate setting section 903. The blending section 904 is connected to the noise reducing section 108. The ROM 110 is connected to the synthesis rate setting section 903. The RAM 1005 is connected to the synthesis rate setting section 903 and the blending section 904.

The controlling section 111 is bidirectionally connected to the buffer section 901, the buffer section 902, the synthesis rate setting section 903, and the blending section 904, so as to control the sections.

The image signal after the space-variant tone conversion process (hereinafter referred to as a "first image signal" as appropriate) which has been transferred from the first tone correcting section 1002 is stored in the buffer section 901.

Moreover, the image signal after the space-invariant tone conversion process (hereinafter referred to as a "second image signal" as appropriate) which has been transferred from the second tone correcting section 1003 is stored in the buffer section 902.

The synthesis rate setting section 903 sets rates at the time of synthesizing the first image signal and the second image signal, that is, a synthesis rate R1 of the first image signal and a synthesis rate R2 of the second image signal. Here, the setting of the synthesis rate R1 and the synthesis rate R2 can be performed by various methods.

First, a first method of setting the synthesis rate R1 and the synthesis rate R2 includes a method of variably setting the synthesis rates R1 and R2. The method is a method in which the synthesis rate setting section 903 extracts the high luminance threshold STh as described above (see FIG. 3) from the RAM 1005, and sets the synthesis rate R1 and the synthesis rate R2 based on the high luminance threshold STh, based on the control by the controlling section 111.

Specifically, when it has been judged by the high luminance region judging section 4023 that the high luminance image signal exists, means for setting the synthesis rates R1 and R2 depending on a ratio of an area of the high luminance region in the image to an area of the entire image is included. Here, the area is not required to be an actual area, and the number of pixels which are pixels included in the high luminance region and the number of pixels which are pixels included in the entire image can be substituted therefor. In other words, in the present embodiment, among all the image signals, a count number of pixels whose inputted luminance value is larger than the high luminance threshold STh may be regarded as the area of the high luminance region. A count number of all the pixels included in all the image signals may be regarded as the area of the entire image. As described above, if the synthesis rates R1 and R2 are set depending on the ratio of the area of the high luminance region to the area of the entire image, for example, the synthesis rates R1 and R2 may be set according to such relationships as represented in Equation 3 and Equation 4.

$$R1 = T \times (Sh/Sa) \qquad \text{[Equation 3]}$$

$$R2 = 1 - R1 \qquad \text{[Equation 4]}$$

Here, Sh represents the area of the high luminance region, Sa represents the area of the entire image, and T represents a constant ($0 \le T \le 1$). R1 satisfies a condition "$0 \le R1 \le 1$", and R1 and R2 satisfy a condition "R1+R2=1", respectively (therefore, R2 satisfies a condition "$0 \le R2 \le 1$").

It should be noted that, in the above description, the synthesis rates have been obtained based on Equation 3 and Equation 4, which, however, of course, is not restrictive, and the synthesis rates may be set based on other relational equations if the relational equations are such relational equations as those with which the synthesis rates can be set depending on the ratio of the area of the high luminance region to the area of the entire image.

Moreover, another method of variably setting the synthesis rate R1 and the synthesis rate R2 includes a method of using variable synthesis rates decided depending on a characteristic of a processing target image signal.

Next, a second method of setting the synthesis rate R1 and the synthesis rate R2 includes a method of fixedly setting the synthesis rates R1 and R2.

The method includes, for example, a method in which previously-decided fixed synthesis rates R1 and R2 have been stored in the ROM 110, and the synthesis rates R1 and R2 are read from the ROM 110 and used.

Alternatively, the user may set the synthesis rates, for example, via the external I/F section 112. Then, the user may be able to freely set the synthesis rates via the external I/F section 112, or the setting may be performed by previously storing a plurality of pairs of the synthesis rates in the ROM 110 and designating one pair of the plurality of pairs of the synthesis rates by the user via the external I/F section 112. In such a case, there is an advantage in that it becomes easy to artificially control a tone improvement effect due to usage of the space-variant tone conversion process.

Subsequently, the blending section 904 uses the synthesis rates R1 and R2 (as described above, variably or fixedly) set by the synthesis rate setting section 903, to synthesize the first image signal and the second image signal, for example, as shown in Equation 5.

$$Fij=R1\times Mij+R2\times Nij \qquad \text{[Equation 4]}$$

Here, Mij is the luminance value at the pixel position (i, j) in the first image signal, Nij is the luminance value at the pixel position (i, j) in the second image signal, and Fij is the luminance value at the pixel position (i, j) in the synthesized image signal.

As described above, a tone in the high luminance region can be retained by using the synthesis rates R1 and R2 to synthesize the first image signal and the second image signal.

It should be noted that, in the above description, the synthesis has been performed according to Equation 5, which, however, is not restrictive, and the synthesis may be performed based on another relational equation if the synthesis rates R1 and R2 set by the synthesis rate setting section 903 are used.

Then, in the above description, an example of setting uniform (space-invariant) synthesis rates for all the pixels in the image signal has been shown, which, however, is not required to be restrictive. For example, the synthesis rates which are different (space-variant) for each pixel constituting the image signal may be set.

A specific example of setting the synthesis rates which are different for each pixel includes an example of varying the synthesis rates R1 and R2 depending on the luminance value. The example will be described with reference to FIG. 4. Here, FIG. 4 is a diagram showing an example of linearly varying synthesis rates R1$ij$ and R2$ij$ depending on the luminance value.

It should be noted that, since the synthesis rates described here become synthesis rates which are different for each pixel position (i, j), the synthesis rate R1 at the pixel position (i, j) is described as the synthesis rate R1$ij$, and the synthesis rate R2 at the pixel position (i, j) is described as the synthesis rate R2$ij$, respectively. Moreover, in the configuration shown in FIG. 7, the luminance value inputted to the synthesis rate setting section 903 is the luminance value applied with the space-invariant tone conversion process, and the luminance value is described as Pij.

Figure 4:
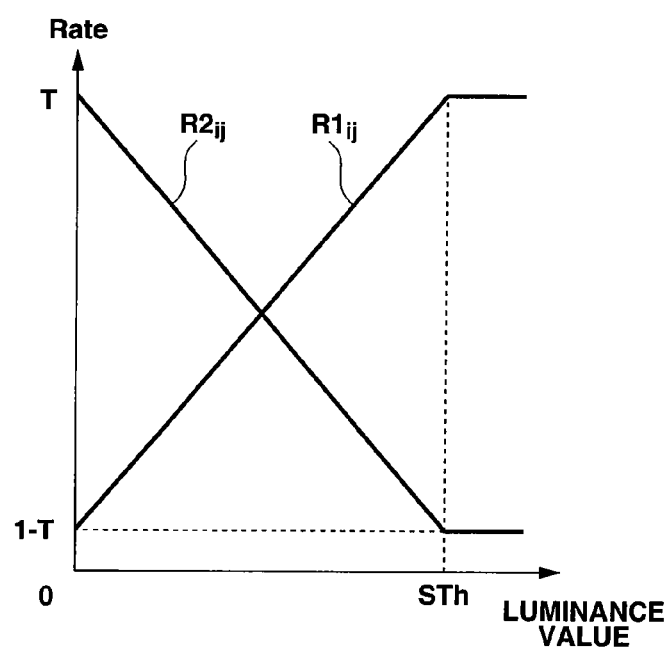
FIG. 4 is a diagram showing an example of linearly varying synthesis rates R1$ij$ and R2$ij$ depending on a luminance value in the above described Embodiment 1.

The example of setting the synthesis rates R1$ij$ and R2$ij$ shown in FIG. 4 is as follows.

First, if the luminance value Pij is larger than the high luminance threshold STh, the synthesis rate R1$ij$ of the space-variant tone-converted image is set to T, and the synthesis rate R2$ij$ of the space-invariant tone-converted image is set to (1−T), respectively (here, T is the constant which is larger than or equal to 0 and less than or equal to 1). In other words, for an image signal region composed of pixels with the luminance value larger than the high luminance threshold STh, the first image signal and the second image signal are synthesized by using the synthesis rate T.

In contrast, if the luminance value Pij is less than or equal to the high luminance threshold STh, the synthesis rate R1$ij$ is set to monotonically increase as the luminance value of the image signal becomes larger (see FIG. 4 and Equation 6), and the synthesis rate R2$ij$ is set to monotonically decrease as the luminance value of the image signal becomes larger (see FIG. 4 and Equation 7). However, also then, a minimum value (corresponding to the luminance value of 0) of the synthesis rate R1$ij$ is set to (1−T), and a maximum value (corresponding to the luminance value of 0) of the synthesis rate R2$ij$ is set to T.

$$R1ij=(1-T)+\{(2T-1)/STh\}\times Pij \qquad \text{[Equation 6]}$$

$$R2ij=1-R1ij \qquad \text{[Equation 7]}$$

It should be noted that, in Equation 6 and Equation 7, the synthesis rates R1$ij$ and R2$ij$ have been set to linearly and monotonically increase or monotonically decrease depending on the luminance value, which, however, is not necessarily required to be set as described above. In other words, an appropriate curve or the like can be used if the setting is performed so that the synthesis rate R1$ij$ of the first image signal (corresponding to "space-variant") becomes larger and the synthesis rate R2$ij$ of the second image signal (corresponding to "space-invariant") becomes smaller, as the luminance value becomes larger.

Figure 8:
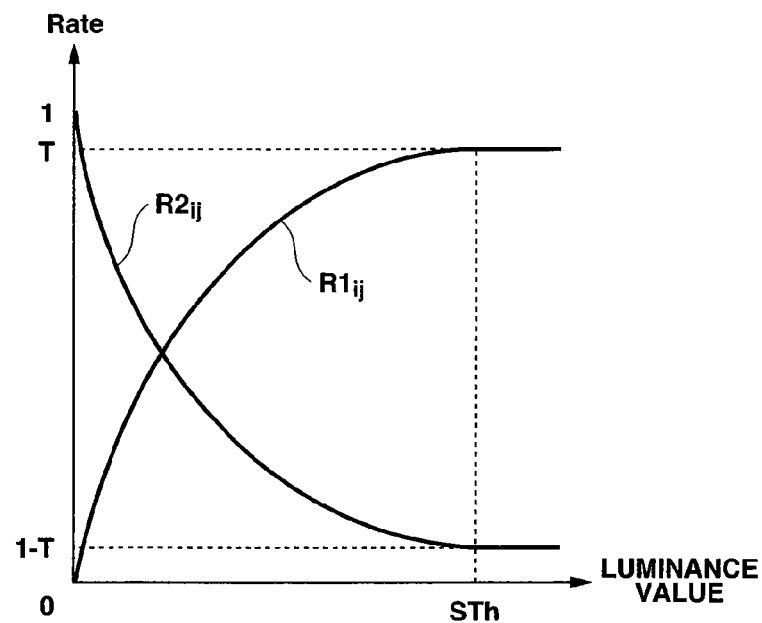
FIG. 8 is a diagram showing an example of nonlinearly varying the synthesis rates R1$ij$ and R2$ij$ depending on the luminance value in the above described Embodiment 1.

For example, the synthesis rate R1$ij$ may nonlinearly and monotonically increase with respect to an increase in the luminance value, and the synthesis rate R2$ij$ may nonlinearly and monotonically decrease with respect to the increase in the luminance value. A specific example of such setting is shown in FIG. 8. Here, FIG. 8 is a diagram showing an example of nonlinearly varying the synthesis rates R1$ij$ and R2$ij$ depending on the luminance value. In the example shown in the FIG. 8, the synthesis rate R1$ij$ has a function shape which is convex upward in a monotonically increasing region, and the synthesis rate R2$ij$ has a function shape which is convex downward in a monotonically decreasing region. Furthermore, in the example shown in the FIG. 8, the minimum value of the synthesis rate R1$ij$ corresponding to the luminance value of 0 is 0, and the maximum value of the synthesis rate R2$ij$ corresponding to the luminance value of 0 is 1. Moreover, when the luminance value Pij is larger than the high luminance threshold STh, the setting is similar to the example shown in FIG. 4.

As described above, if the synthesis rate R1$ij$ and the synthesis rate R2$ij$ are set for each pixel depending on the luminance value, there is an advantage in that the tone in each luminance region can be flexibly retained depending on the luminance value.

It should be noted that, in the above description, the synthesis rates R1$ij$ and R2$ij$ for each pixel are calculated based on the luminance value Pij applied with the space-invariant tone conversion process, which, however, is not restrictive, and for example, the synthesis rates R1$ij$ and R2$ij$ for each pixel may be calculated based on the luminance value Kij before the tone conversion process, which is calculated as shown in Equation 1 by the above described luminance signal converting section 401.

Moreover, in such a space-variant tone conversion process as described above, a tone characteristic for each zone cannot be artificially adjusted. Therefore, for example, if such a space-variant tone conversion process as described above is applied to a low luminance region in the image, a noise level of a dark portion may be emphasized. An example of setting the synthesis rates in order to improve the emphasis thereof will be described with reference to FIG. 9. Here, FIG. 9 is a diagram showing an example of linearly varying the synthesis rates R1$ij$ and R2$ij$ depending on the luminance value and reducing dark noise.

Figure 9:
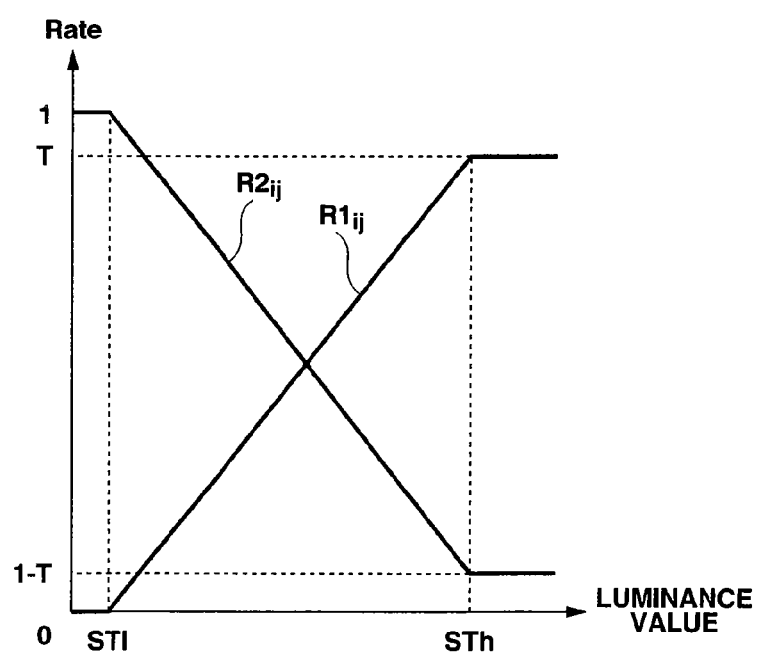
FIG. 9 is a diagram showing an example of linearly varying the synthesis rates R1$ij$ and R2$ij$ depending on the luminance value and reducing dark noise in the above described Embodiment 1.

In the example shown in the FIG. 9, a low luminance threshold STl is set, and if the luminance value Pij is smaller than the low luminance threshold STl, the synthesis rate R1*ij* is set to 0 and the synthesis rate R2*ij* is set to 1. In other words, for an image signal region composed of pixels with the luminance value smaller than the low luminance threshold STl, the image signal after the space-variant tone conversion process is not used, and only the image signal after the space-invariant tone conversion process is outputted as a result of the tone conversion. It should be noted that, for the low luminance threshold STl, previously set values may be saved in the ROM 110 and read if necessary, or the user may set a desired value, or the user may select a value from several candidates.

Moreover, if the luminance value Pij is larger than the high luminance threshold STh, the setting is similar to the example shown in FIG. 4.

Then, if the luminance value Pij is larger than or equal to the low luminance threshold STl and less than or equal to the high luminance threshold STh, the synthesis rates R1*ij* and R2*ij* are calculated by using Equation 8 and Equation 9.

$$R1ij=T\times\{(Pij-STl)/(STh-STl)\} \quad \text{[Equation 8]}$$

$$R2ij=1-R1ij \quad \text{[Equation 9]}$$

It should be noted that the monotonic increase of the synthesis rate R1*ij* and the monotonic decrease of the synthesis rate R2*ij* as shown in Equation 8 and Equation 9 are not necessarily required to be linear, similarly to the above description.

Furthermore, in the above description, an example of setting the synthesis rates R1 and R2 in the entire image or in units of pixels has been described, which, however, is not restrictive. For example, the image signal is divided into a plurality of zones, and an average luminance value or an intermediate luminance value is calculated for each divided zone. Then, it is conceivable to divide the average luminance value or the intermediate luminance value by a predetermined value, to set a result thereof as the synthesis rate R1, and to set 1−R1 as the synthesis rate R2. Then, the image signal may be synthesized by using the synthesis rate R1 for the image signal after the space-variant tone conversion process, and also using the synthesis rate R2 for the image signal after the space-invariant tone conversion process, for each zone. As described above, the synthesis of the image signal may be performed in units of zones.

The blending section 904 uses the synthesis rates R1*ij* and R2*ij* set by the synthesis rate setting section 903, to synthesize the first image signal Mij and the second image signal Nij, for example, as shown in Equation 10.

$$Fij=R1ij\times Mij+R2ij\times Nij \quad \text{[Equation 10]}$$

Then, the blending section 904 transfers the synthesized image signal to the noise reducing section 108, based on the control by the controlling section 111.

Subsequently, the noise reducing section 108 calculates a noise amount (noise level) which is estimated to be included in the image signal transferred from the synthesizing section 1004 or the second tone correcting section 1003, with noise detecting means, and performs the noise reduction process for the above described image signal based on the calculated noise amount, with noise reducing means. Here, the noise reducing section 108 estimates the noise amount for each pixel and performs the noise reduction process, for example, by using such a known technique as described in the above described Japanese Patent Application Laid-Open Publication No. 2005-303802.

It should be noted that, in the above description, although the image signal processing apparatus having a configuration in which the image pickup section including the lens system 100, the aperture 101, the CCD 102, the amplifying section 103, and the A/D converting section 104 has been integrated has been described, the image signal processing apparatus is not required to be limited to such a configuration, and the image pickup section may be separated. In other words, an image signal processing apparatus which reads an image signal picked up by the separate image pickup section and recorded in a form of unprocessed RAW data in a recording medium such as a memory card, from the above described recording medium, and processes the image signal, is also possible. However, then, it is assumed that information (an ISO sensitivity, a white balance coefficient and the like) at the time of the shooting has been recorded in a header section or the like. It should be noted that transmission of various kinds of information from the separate image pickup section to the image signal processing apparatus is not limited to be performed via the recording medium, and may be performed via a communication line or the like.

Furthermore, in the above description, a process by hardware has been premised, which, however, is not required to be limited to such a configuration. For example, the signal from the CCD 102 is recorded as the RAW data which has still been unprocessed, in the recording medium such as the memory card, and also, the information (the ISO sensitivity, the white balance coefficient and the like) at the time of the shooting from the controlling section 111 is previously recorded as header information in the recording medium. Then, it is also possible to cause a computer to execute an image signal processing program which is separate software, cause the computer to read the information in the recording medium, and perform the process. It should be noted that the transmission of the various kinds of information from the image pickup section to the computer is not limited to be performed via the recording medium, and may be performed via the communication line or the like, similarly to the above description.

Figure 10:
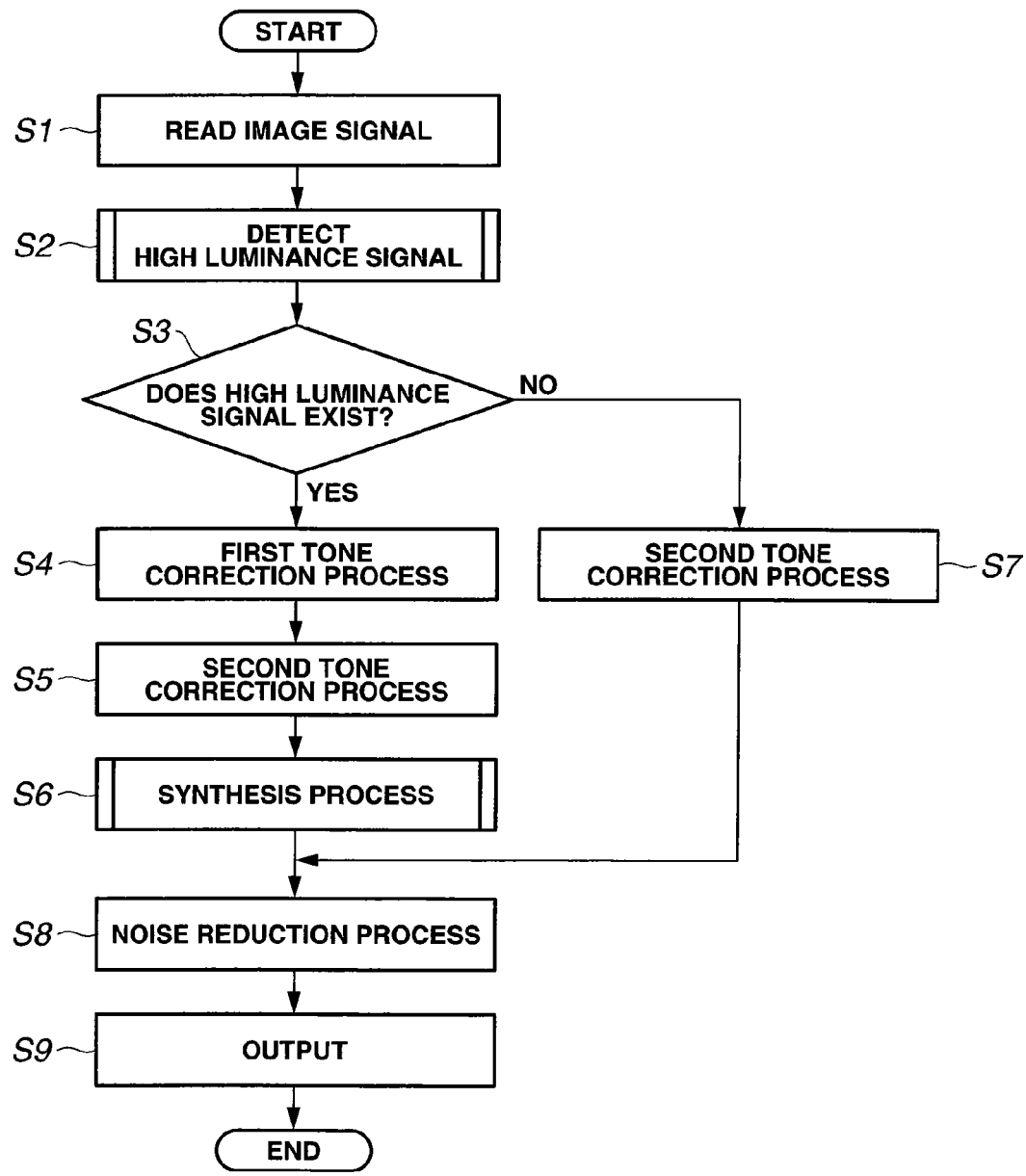
FIG. 10 is a flowchart showing a process by an image signal processing program in the above described Embodiment 1.

FIG. 10 is a flowchart showing a process by the image signal processing program.

When the process is started, first, the image signal, the above described header information and the like are read, and also, the information on the γ characteristic data and the like, which has been previously provided in the above described image signal processing program, is read (step S1). The process corresponds to a process for shooting the subject and obtaining the image signal in the image signal processing apparatus which is the image pickup apparatus.

Next, it is detected whether or not the high luminance image signal exists in the read image signal (step S2). The process corresponds to the process performed by the above described specific luminance region detecting section 402.

Subsequently, based on a result of the detection in step S2, it is determined whether or not the high luminance image signal exists in the image signal (step S3). The process corresponds to the process performed by the tone converting section 107 and the controlling section 111.

Here, if it has been determined that the high luminance image signal exists, a first tone correction process which is space-variant is performed for the image signal (step S4). The process corresponds to the process performed by the first tone correcting section 1002.

Subsequently, a second tone correction process which is space-invariant is performed for the image signal by using the γ characteristic data read in step S1 (step S5). The process corresponds to the process performed by the second tone correcting section 1003.

It should be noted that, here, the first tone correction process is performed first and subsequently the second tone correction process is performed, which, however, may be in a reverse order thereof, or the first tone correction process and the second tone correction process may be simultaneously performed in parallel.

Then, the first image signal obtained in step S4 and the second image signal obtained in step S5 are synthesized (step S6). The process corresponds to the process performed by the synthesizing section 1004.

Moreover, if it has been determined in step S3 that the high luminance image signal does not exist, the second tone correction process which is space-invariant is performed for the image signal by using the γ characteristic data read in step S1 (step S7). The process also corresponds to the process performed by the second tone correcting section 1003, similarly to the process in step S5.

When the process in step S6 or the process in step S7 is completed, the known noise reduction process is performed (step S8). The process corresponds to the process performed by the noise reducing section 108.

Subsequently, after the image signal after the noise reduction is outputted, and displayed on the displaying apparatus, or stored in the memory card or the like (step S9), the process is completed.

Figure 11:
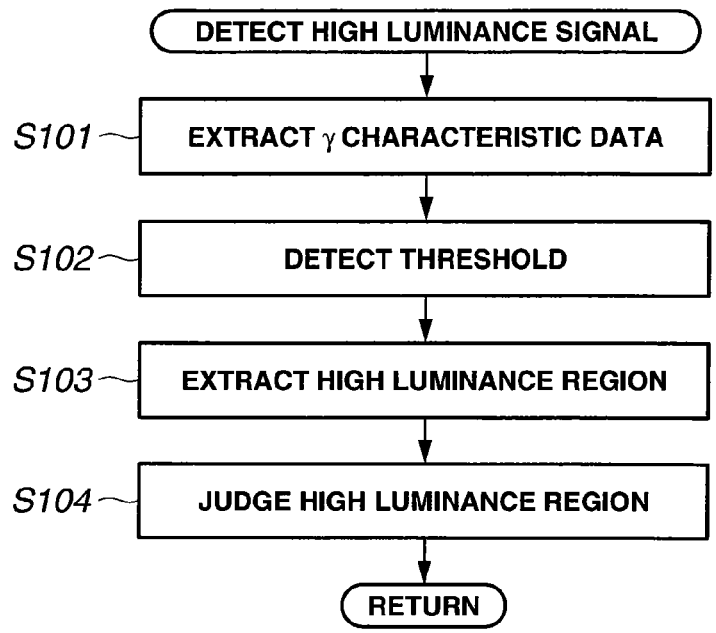
FIG. 11 is a flowchart showing details of a high luminance signal detection process in step S2 of FIG. 10, in the above described Embodiment 1.

Next, FIG. 11 is a flowchart showing details of the high luminance signal detection process in step S2 of FIG. 10.

When the process is started, first, the γ characteristic data corresponding to the predetermined displaying apparatus is extracted (step S101). The process corresponds to the process performed by the γ characteristic data extracting section 4021.

Next, as shown in FIG. 3, the input level at the time when the slope angle Δ (Equation 2) corresponding to the γ characteristic data has first become smaller than the predetermined angle ΔTH recognized as the whiteout is set as the high luminance threshold (STh shown in FIG. 3) (step S102). The process corresponds to the process performed by the high luminance region threshold detecting section 4022.

Subsequently, the luminance values of all the pixels included in the image are compared with the high luminance threshold, and the number of pixels with the luminance value larger than the high luminance threshold (the pixels determined as the high luminance image signal) is counted (step S103).

Then, the count number of the high luminance image signal is compared with the predetermined threshold. If the count number of the high luminance image signal is larger than the predetermined threshold, it is judged that the high luminance image signal exists in the image. On the other hand, if the count number of the high luminance image signal is smaller than the predetermined threshold, it is judged that the high luminance image signal does not exist in the image (step S104). The processes in step S103 and step S104 correspond to the process performed by the high luminance region judging section 4023.

When the process in step S104 is completed, subsequently, the process returns to the process shown in FIG. 10.

It should be noted that, although an example of automatically setting the high luminance threshold has been described here, the setting may be manually performed by a user input. Then, instead of the processes in step S101 and step S102 of FIG. 11, a process for manually inputting the high luminance threshold may be performed.

Figure 12:
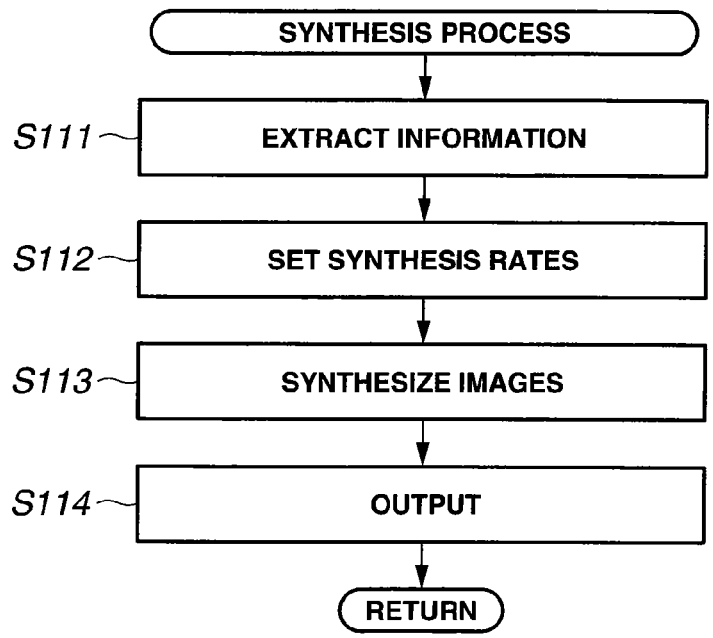
FIG. 12 is a flowchart showing details of a synthesis process in step S6 of FIG. 10, in the above described Embodiment 1.

Subsequently, FIG. 12 is a flowchart showing details of the synthesis process in step S6 of FIG. 10.

When the process is started, first, information on the threshold of the high luminance image signal, the area of the high luminance region (the number of pixels in the high luminance region), and the area of the entire image region (the number of pixels in the entire image region), which have been detected in step S2, an image after the space-variant tone conversion process which has been obtained in the process in step S4, an image after the space-invariant tone conversion process which has been obtained in the process in step S5, and the like is extracted (step S111).

Next, based on the information extracted in step S111, the synthesis rate R1$ij$ and the synthesis rate R2$ij$ are calculated, for example, by using the above described Equation 6 and Equation 7 (step S112). The process corresponds to the process performed by the synthesis rate setting section 903.

Furthermore, the image after the space-variant tone conversion process and the image after the space-invariant tone conversion process are synthesized by using the synthesis rates R1$ij$ and R2$ij$ calculated in step S112, and for example, by using the above described Equation 10 (step S113). The process corresponds to the process performed by the blending section 904.

Subsequently, the synthesized image is outputted to the noise reduction process at a post stage (step S114), and the process returns from the above process to the process shown in FIG. 10.

It should be noted that a technique as described above is applicable to both a case where the image signal is a still image signal and a case where the image signal is a moving image signal.

Moreover, in the above description, the image signal processing apparatus and the image signal processing program have been described, which, however, are not restrictive, and an image signal processing method for performing the process as described above is also possible.

According to Embodiment 1 as described above, if the high luminance signal exists, for an original image signal, the space-variant tone conversion process is performed for each zone (for each pixel or for each pixel region). Therefore, the tone characteristic of the pixel or the pixel region belonging to the high luminance region is retained without being compressed. Moreover, if the high luminance signal does not exist, only the space-invariant tone conversion process is performed. Therefore, power consumption can be reduced and the processes can be accelerated.

Furthermore, for the high luminance region in the image signal, a result of the space-variant tone conversion process corresponding to the above described high luminance region is substantially used. However, for regions other than the high luminance region, a result of synthesizing the space-variant tone-converted image and the space-invariant tone-converted image is used. Therefore, the tone in the high luminance region is retained, and simultaneously, the tone in the low luminance region to a middle luminance region is extended, and an image in which a tone reproduction characteristic has been reflected can be obtained.

Then, if the synthesis rates at the time of synthesizing the space-variant tone-converted image and the space-invariant tone-converted image are set depending on the ratio of the area of the high luminance region in the image to the area of the entire image, appropriate synthesis depending on a degree of inclusion of a high luminance portion in the image can be performed.

Additionally, if the synthesis rates are set for each pixel or for each zone, appropriate synthesis depending on each image portion can be performed.

Embodiment 2

Figure 13:
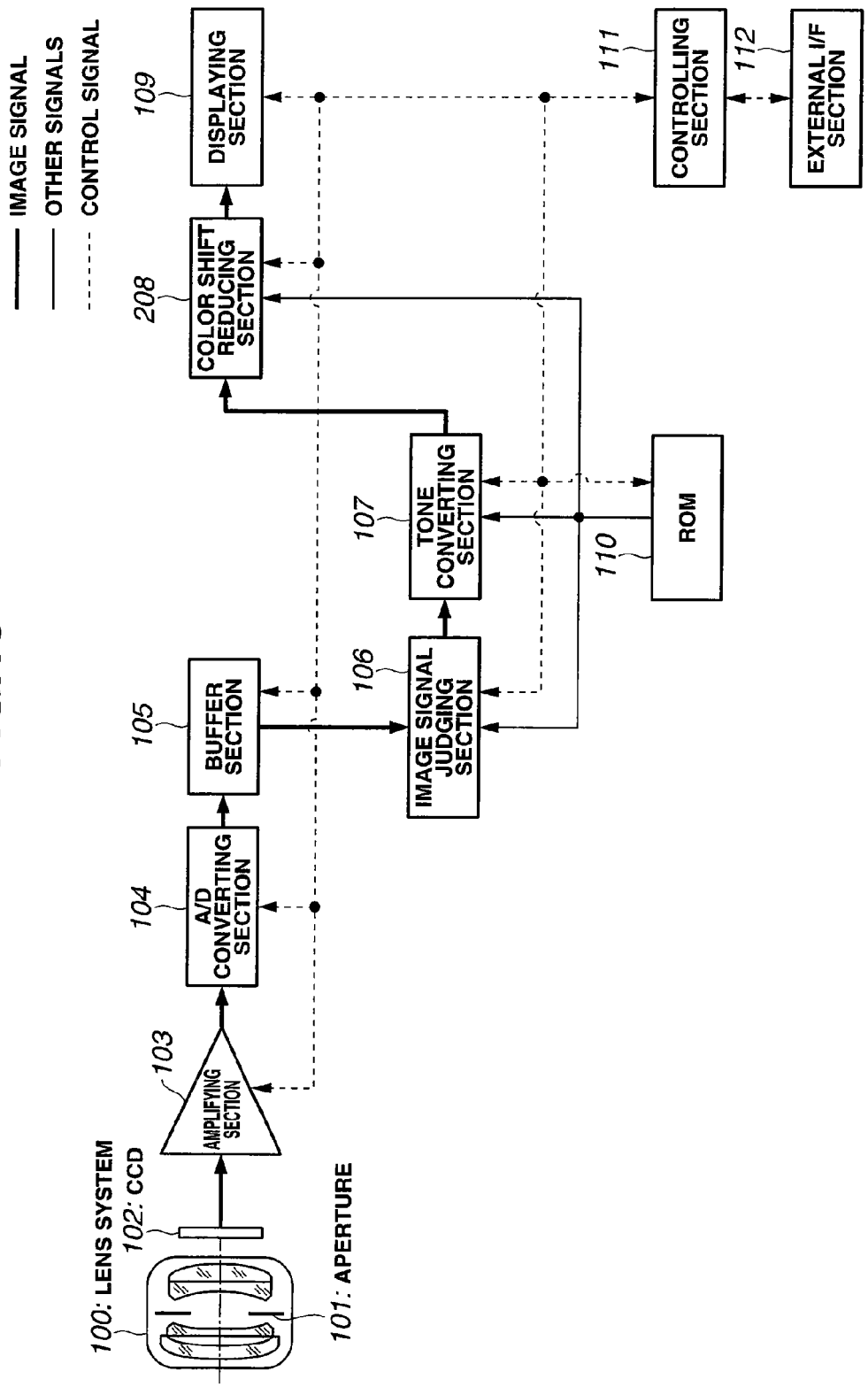
FIG. 13 is a block diagram showing a configuration of the image signal processing apparatus in Embodiment 2 of the present invention.

FIGS. 13 to 23 show Embodiment 2 of the present invention. FIG. 13 is a block diagram showing a configuration of the image signal processing apparatus. In Embodiment 2, the same reference numerals are attached to sections similar to the above described Embodiment 1, descriptions thereof are omitted, and mainly, only different points will be described.

Embodiment 2 has a configuration in which, in the image signal processing apparatus shown in FIG. 1 of Embodiment 1, the noise reducing section 108 is replaced with a color shift reducing section 208 which is the image quality degradation information obtaining means and the image quality correcting means. Other basic configurations are similar to the above described Embodiment 1.

The image signal judging section 106 is connected to the displaying section 109 via the tone converting section 107 and the color shift reducing section 208. The ROM 110 is connected to the image signal judging section 106, the tone converting section 107, and the color shift reducing section 208.

The controlling section 111 is bidirectionally connected to the amplifying section 103, the A/D converting section 104, the buffer section 105, the image signal judging section 106, the tone converting section 107, the color shift reducing section 208, the displaying section 109, the ROM 110 and the external I/F section 112, so as to control the sections.

Next, an operation of the image signal processing apparatus as shown in FIG. 13 will be described along the flow of the image signal.

When the shutter button is depressed via the external I/F section 112, the image is picked up by the lens system 100, the aperture 101 and the CCD 102, and the image signal is outputted, amplified by the amplifying section 103, and converted into the digital signal by the A/D converting section 104. It should be noted that, also in the present embodiment, it is assumed that the above described video signal is a color video signal including the three components of R, G and B.

The image signal from the A/D converting section 104 is transferred to the buffer section 105 and stored therein.

For the image signal transferred from the buffer section 105, the image signal judging section 106 determines whether or not the high luminance image signal exists, based on a predetermined high luminance threshold, and also, determines whether or not a low luminance image signal exists, based on a predetermined low luminance threshold, and thereby obtains a high/low luminance determination result. In other words, the image signal judging section 106 of the present embodiment determines not only existence or non existence of the high luminance image signal, but also existence or non existence of the low luminance image signal. It should be noted that it is assumed that the high luminance threshold and the low luminance threshold are automatically designated based on the γ characteristic data, according to a technique which is almost similar to that of the above described Embodiment 1. However, the user may be able to freely set the high luminance threshold and the low luminance threshold through the external I/F section 112, or the user may designate each one of the plurality of high luminance thresholds and a plurality of low luminance thresholds which have been previously prepared in the ROM 110, through the external I/F section 112, similarly to that of the above described Embodiment 1. Then, the image signal judging section 106 transfers the high/low luminance determination result along with the image signal to the tone converting section 107.

The tone converting section 107 performs the tone conversion process corresponding to the image signal, for the above described image signal, based on the transferred high/low luminance determination result, and transfers the processed image signal to the color shift reducing section 208.

The color shift reducing section 208 performs a color shift reduction process for the transferred image signal, and transfers the processed image signal to the displaying section 109.

The displaying section 109 performs the display based on the transferred image signal.

Next, the configuration of the image signal judging section 106 is basically similar to the configuration shown in FIG. 2 in the above described Embodiment 1. However, the configuration of the specific luminance region detecting section 402 provided within the image signal judging section 106 is different from the above described Embodiment 1, and thus will be described with reference to FIG. 14.

Figure 14:
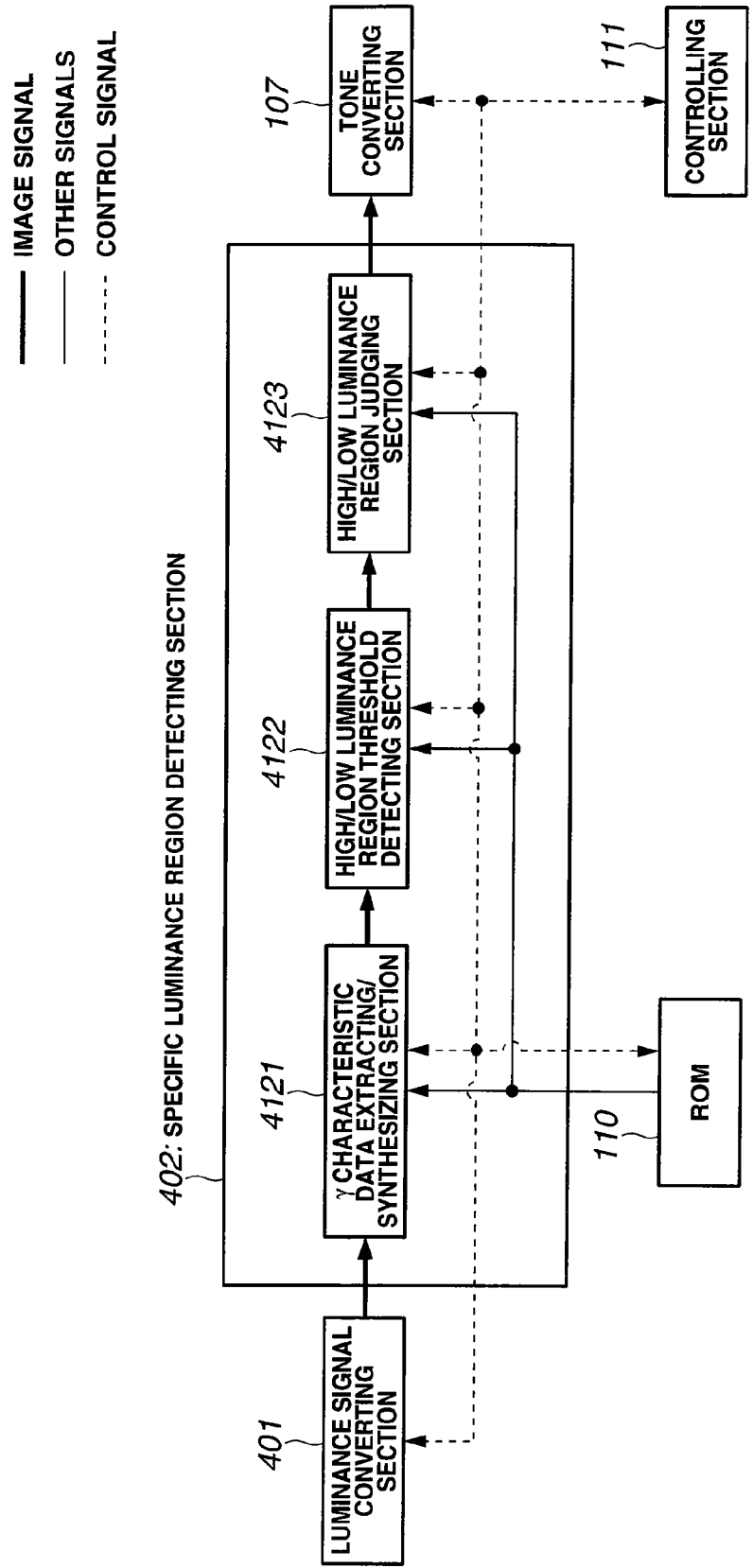
FIG. 14 is a block diagram showing an example of a configuration of the specific luminance region detecting section in the above described Embodiment 2.

FIG. 14 is a block diagram showing an example of the configuration of the specific luminance region detecting section 402.

The specific luminance region detecting section 402 is configured to have a γ characteristic data extracting/synthesizing section 4121, a high/low luminance region threshold detecting section 4122 which is the threshold setting means, and a high/low luminance region judging section 4123 which is the specific luminance region detecting means.

The luminance signal converting section 401 is connected to the tone converting section 107 via the γ characteristic data extracting/synthesizing section 4121, the high/low luminance region threshold detecting section 4122, and the high/low luminance region judging section 4123. The ROM 110 is connected to the γ characteristic data extracting/synthesizing section 4121, the high/low luminance region threshold detecting section 4122, and the high/low luminance region judging section 4123.

The controlling section 111 is bidirectionally connected to the γ characteristic data extracting/synthesizing section 4121, the high/low luminance region threshold detecting section 4122, and the high/low luminance region judging section 4123, so as to control the sections.

As described above, when the space-invariant tone conversion is performed, the phenomenon may occur in which the image signal without the whiteout before the conversion includes the whiteout after the conversion. In Embodiment 1, improvement in such a phenomenon has been performed. In contrast, in Embodiment 2, furthermore, it is an object to also improve a phenomenon in which an image signal without blackout before the space-invariant tone conversion includes the blackout after the conversion.

Figure 17:
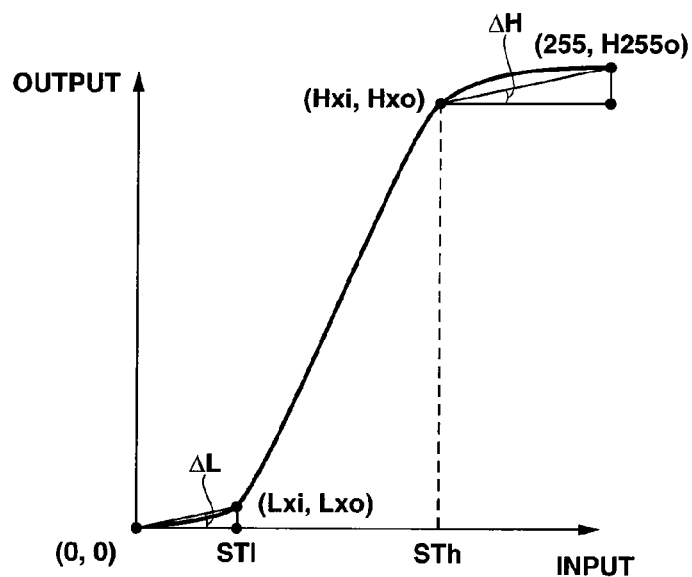
FIG. 17 is a diagram showing γ characteristic data obtained by synthesizing picture generation γ characteristic data and γ characteristic data for a displaying apparatus in the above described Embodiment 2.

Here, a cause of occurrence of the whiteout or the blackout is that, for example, if a tone conversion curve (γ characteristic data) as shown in FIG. 17 to be described later is used, since the gradient of the γ characteristic data corresponding to a tone characteristic region in the high luminance portion and a tone characteristic region in a low luminance portion is almost horizontal, the variation in light and shade in the image signal corresponding to the portions is almost lost after the tone conversion has been performed. Here, FIG. 17 is a diagram showing γ characteristic data obtained by synthesizing picture generation γ characteristic data and γ characteristic data for the displaying apparatus. Then, in a case of the γ characteristic data as shown in the FIG. 17, a high luminance portion image signal includes the whiteout, and a low luminance portion image signal includes the blackout. In order to improve the tone characteristic of such high luminance portion and low luminance portion image signals, first, it is necessary to detect the high luminance threshold and the low luminance threshold for identifying the high luminance region and the low luminance region.

Such an operation of the specific luminance region detecting section 402 will be described along FIG. 14.

The γ characteristic data extracting/synthesizing section 4121 extracts the γ characteristic data (picture generation γ characteristic data) appropriate for image processing and the γ characteristic data appropriate for displaying the image by the displaying apparatus included in the displaying section 109, from the ROM 110, generates the γ characteristic data as shown in FIG. 17 by synthesizing the above γ characteristic data, and transfers the generated γ characteristic data to the high/low luminance region threshold detecting section 4122. Here, the picture generation γ characteristic data means tone conversion data for adjusting variation in brightness or contrast of the image.

The high/low luminance region threshold detecting section 4122 extracts an angle ΔHTH recognized as the whiteout and an angle ΔLTH recognized as the blackout from the ROM 110. Then, based on the extracted angle ΔHTH recognized as the whiteout, and the γ characteristic data as shown in FIG. 17 which has been transferred from the γ characteristic data extracting/synthesizing section 4121, the high/low luminance region threshold detecting section 4122 first calculates a slope ΔH corresponding to the high luminance threshold STh, as shown in the following Equation 11.

$$\Delta H = \arctan\{(H255o - Hxo)/(255 - Hxi)\} \quad \text{[Equation 11]}$$

Here, an x-th input level counted in ascending order is set as Hxi, an output level corresponding to the input level Hxi is set as Hxo, and (Hxi, Hxo) is set as the point of interest. Furthermore, an output level corresponding to the maximum input level 255 is set as H255o, and (255, H255o) is set as the maximum point. Then, while the point of interest is moved in ascending order of the input level, the slope angle ΔH of the line going through the point of interest and the maximum point is calculated as shown in Equation 11. The input level of the point of interest at the time when the slope angle ΔH calculated in the order according to the movement of the point of interest has first become smaller than the predetermined angle ΔHTH read from the ROM 110 is set as the high luminance threshold STh.

Next, based on the extracted angle ΔLTH recognized as the blackout, and the γ characteristic data as shown in FIG. 17 which has been transferred from the γ characteristic data extracting/synthesizing section 4121, the high/low luminance region threshold detecting section 4122 calculates a slope ΔL corresponding to the low luminance threshold STl, as shown in the following Equation 12.

$$\Delta L = \arctan(Lxo/Lxi) \quad \text{[Equation 12]}$$

Here, an x-th input level counted in ascending order is set as Lxi, an output level corresponding to the input level Lxi is set as Lxo, and (Lxi, Lxo) is set as the point of interest. Furthermore, a minimum point is (0, 0). Then, while the point of interest is moved from the maximum point in order toward a smallest input level (that is, in descending order of the input level), the slope angle ΔL of a line going through the minimum point and the point of interest is calculated as shown in Equation 12. The input level of the point of interest at the time when the slope angle ΔL calculated in the order according to the movement of the point of interest has first become smaller than the predetermined angle ΔLTH read from the ROM 110 is set as the low luminance threshold STl.

Subsequently, the high/low luminance region threshold detecting section 4122 transfers the high luminance threshold STh and the low luminance threshold STl which have been estimated as described above, and the image signal, to the high/low luminance region judging section 4123.

It should be noted that, here, the high/low luminance region threshold detecting section 4122 calculates the high luminance threshold STh and the low luminance threshold STl based on the synthesized γ characteristic data, which, however, is not restrictive. For example, of course, it is also possible to have a configuration in which the high luminance threshold STh and the low luminance threshold STl corresponding to the synthesized γ characteristic data have been previously saved in the ROM 110, and when the image signal is processed, the high luminance threshold STh and the low luminance threshold STl are extracted from the ROM 110.

The high/low luminance region judging section 4123 counts the number of the high luminance image signals among all the image signals, with a high luminance counter, based on the transferred high luminance threshold STh, and also counts the number of the low luminance image signals among all the image signals, with a low luminance counter, based on the transferred low luminance threshold STl. Here, the counting of the high luminance image signal is performed if the luminance value is larger than the high luminance threshold STh, and the counting of the low luminance image signal is performed if the luminance value is smaller than the low luminance threshold STl.

Then, the high/low luminance region judging section 4123 compares the value of the high luminance counter after all the pixels have been processed, with the predetermined threshold (high luminance image signal threshold) read from the ROM 110. If the value of the high luminance counter is larger than the predetermined high luminance image signal threshold, the high/low luminance region judging section 4123 determines that the high luminance image signal exists in the image. If the value of the high luminance counter is less than or equal to the predetermined high luminance image signal threshold, the high/low luminance region judging section 4123 determines that the high luminance image signal does not exist in the image.

Furthermore, the high/low luminance region judging section 4123 compares the value of the low luminance counter after all the pixels have been processed, with the predetermined threshold (low luminance image signal threshold) read from the ROM 110. If the value of the low luminance counter is larger than the predetermined low luminance image signal threshold, the high/low luminance region judging section 4123 determines that the low luminance image signal exists in the image. If the value of the low luminance counter is less than or equal to the predetermined low luminance image signal threshold, the high/low luminance region judging section 4123 determines that the low luminance image signal does not exist in the image.

The high/low luminance region judging section 4123 sets the existence or non existence of the high luminance image signal and the existence or non existence of the low luminance image signal as the high/low luminance determination result.

Subsequently, the high/low luminance region judging section 4123 transfers the high/low luminance determination result, the high luminance threshold STh and the low luminance threshold STl, and the image signal, to the tone converting section 107.

Figure 15:
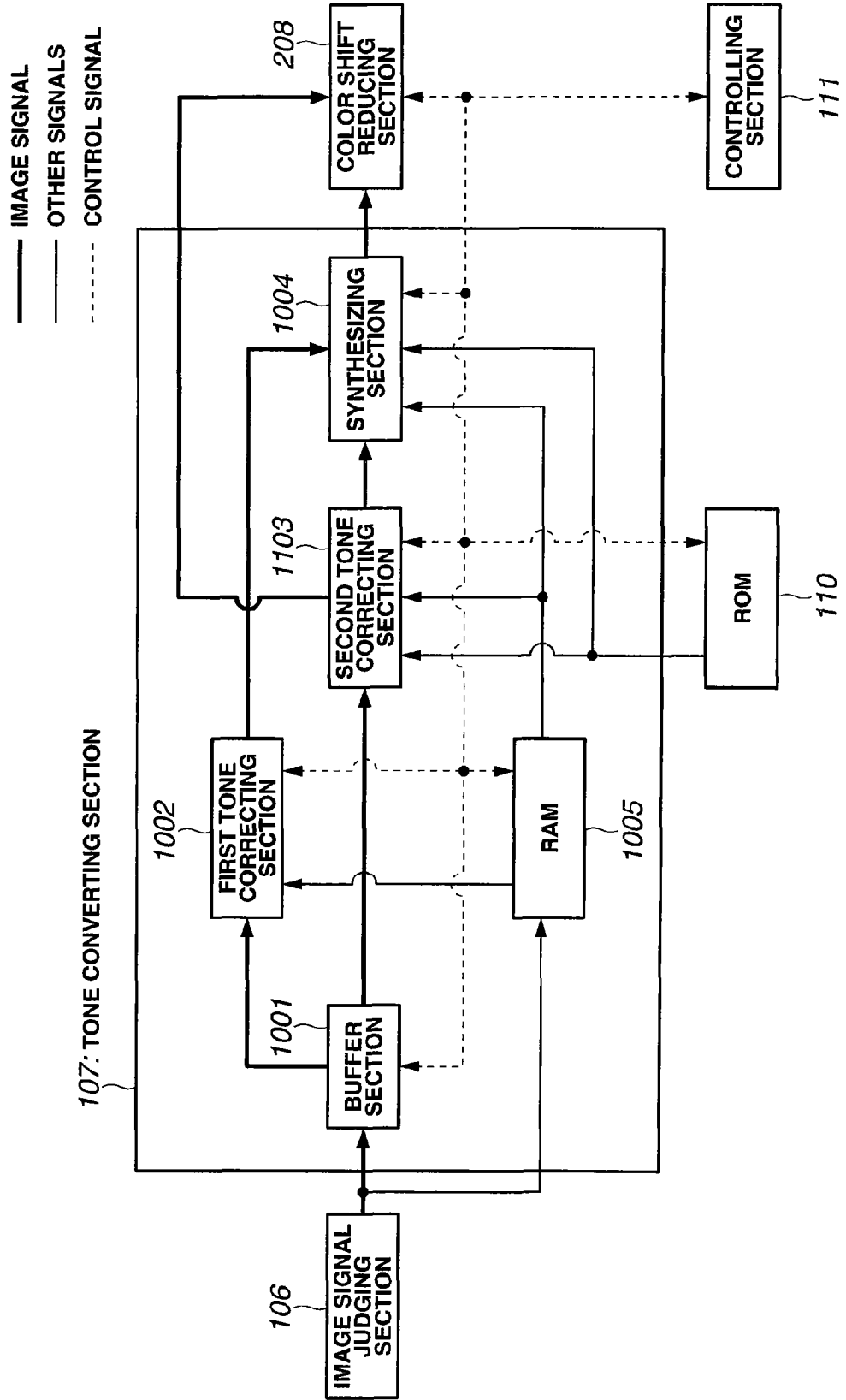
FIG. 15 is a block diagram showing an example of a configuration of the tone converting section in the above described Embodiment 2.

FIG. 15 is a block diagram showing an example of the configuration of the tone converting section 107.

The configuration of the tone converting section 107 is almost similar to that of the tone converting section 107 shown in FIG. 6 in the above described Embodiment 1. However, the configuration of the tone converting section 107 is different in that the second tone correcting section 1003 which is the second tone conversion processing means has been replaced with a second tone correcting section 1103 which is the second tone conversion processing means.

The buffer section 1001 is connected to the first tone correcting section 1002 and the second tone correcting section 1103. The first tone correcting section 1002 and the second tone correcting section 1103 are connected to the synthesizing section 1004. The second tone correcting section 1103 and the synthesizing section 1004 are connected to the color shift reducing section 208. The RAM 1005 is connected to the first tone correcting section 1002, the second tone correcting section 1103, and the synthesizing section 1004. The ROM 110 is connected to the second tone correcting section 1103 and the synthesizing section 1004.

The controlling section 111 is also bidirectionally connected to the second tone correcting section 1103, so as to control the section.

The image signal from the image signal judging section 106 is saved in the buffer section 1001, and the high luminance threshold, the low luminance threshold, and the high/low luminance determination result from the image signal judging section 106 are saved in the RAM 1005, respectively.

The tone converting section 107 extracts the high/low luminance determination result from the RAM 1005, and determines whether or not the high luminance image signal or the low luminance image signal exists, based on the control by the controlling section 111. Then, if the tone converting section 107 has determined that at least one of the high luminance image signal and the low luminance image signal exists, the tone converting section 107 transfers the image signal within the buffer section 1001 to the first tone correcting section 1002 and the second tone correcting section 1103, based on the control by the controlling section 111. On the other hand, if the tone converting section 107 has determined that both the high luminance image signal and the low luminance image signal do not exist, the tone converting section 107 transfers the image signal within the buffer section 1001 only to the second tone correcting section 1103, based on the control by the controlling section 111.

The first tone correcting section 1002 performs the space-variant tone conversion process for the image signal transferred from the buffer section 1001, similarly to the above described Embodiment 1, based on the control by the controlling section 111. Then, the first tone correcting section 1002 transfers the image signal after the tone conversion process, to the synthesizing section 1004. It should be noted that if it has been determined that both the high luminance image signal and the low luminance image signal do not exist, the image signal is controlled not to be transferred from the buffer section 1001 to the first tone correcting section 1002, and thus the above described first tone correcting section 1002 does not perform the process.

Moreover, the second tone correcting section 1103 extracts predetermined picture generation γ characteristic data and the γ characteristic data appropriate for displaying the image by the displaying apparatus in the displaying section 109, from the ROM 1005, further synthesizes the above γ characteristic data, and generates the synthesized γ characteristic data. Then, the second tone correcting section 1103 uses the synthesized γ characteristic data to perform the space-invariant tone conversion process for the image signal transferred from the buffer section 1001.

If it has been determined that at least one of the high luminance image signal and the low luminance image signal exists, the second tone correcting section 1103 transfers the processed image signal to the synthesizing section 1004 based on the control by the controlling section 111. Moreover, if it has been determined that both the high luminance image signal and the low luminance image signal do not exist, the second tone correcting section 1103 transfers the processed image signal to the color shift reducing section 208 based on the control by the controlling section 111.

Figure 16:
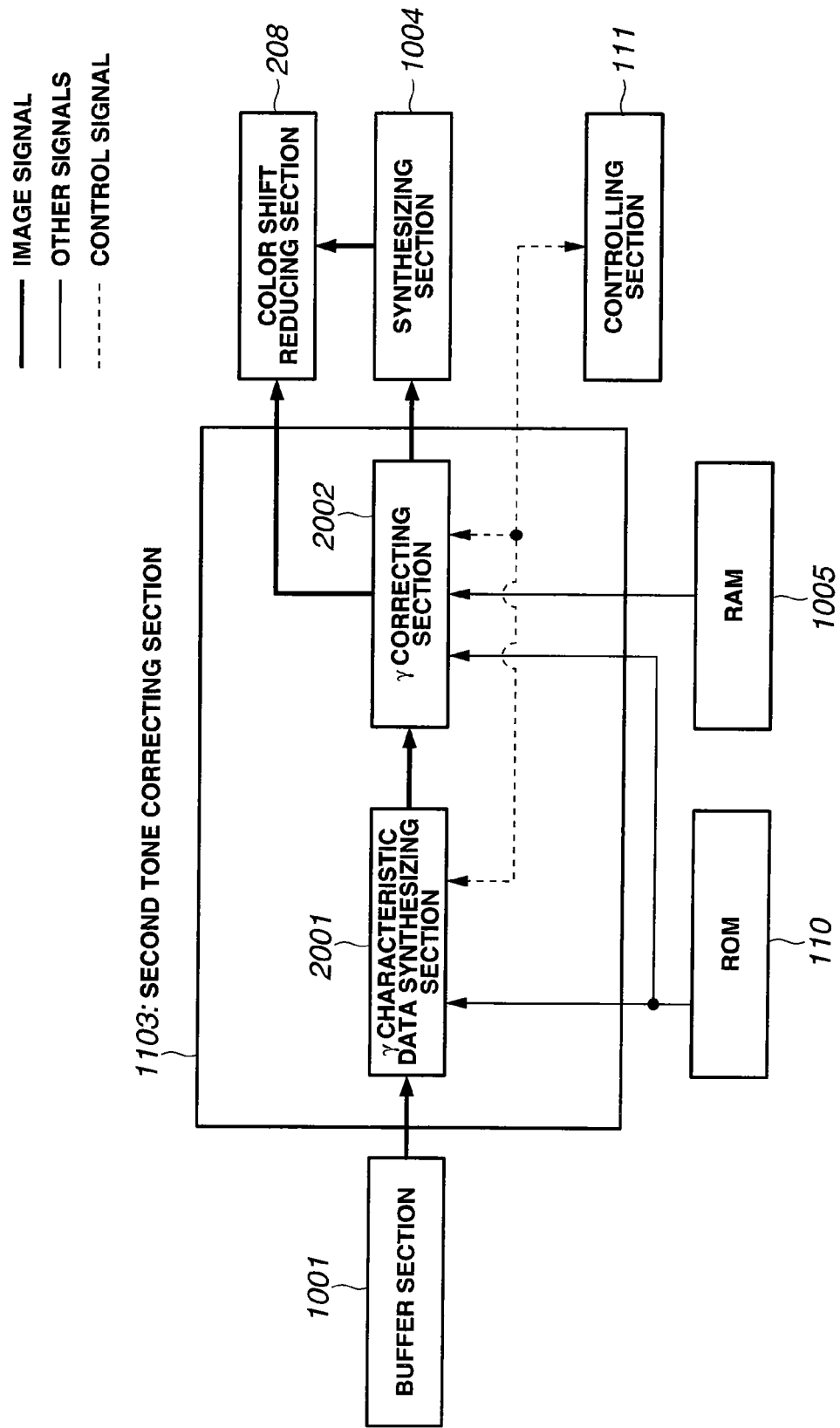
FIG. 16 is a block diagram showing an example of a configuration of a second tone correcting section in the above described Embodiment 2.

Here, with reference to FIG. 16, more detailed configuration and operation of the second tone correcting section 1103 will be described. FIG. 16 is a block diagram showing an example of a configuration of the second tone correcting section 1103.

The second tone correcting section 1103 is configured to have a γ characteristic data synthesizing section 2001, and a γ correcting section 2002.

The buffer section 1001 is connected to the synthesizing section 1004 via the γ characteristic data synthesizing section 2001 and the γ correcting section 2002. The γ correcting section 2002 is also connected to the color shift reducing section 208. The ROM 110 is connected to the γ characteristic data synthesizing section 2001 and the γ correcting section 2002. The RAM 1005 is connected to the γ correcting section 2002. The controlling section 111 is bidirectionally connected to the γ characteristic data synthesizing section 2001 and the γ correcting section 2002, so as to control the sections.

The γ characteristic data synthesizing section 2001 extracts the predetermined picture generation γ characteristic data and γ correction data corresponding to the predetermined displaying apparatus, from the ROM 110, synthesizes the predetermined picture generation γ characteristic data and the γ correction data, and generates the synthesized γ characteristic data, for example, as shown in FIG. 17. The γ characteristic data synthesizing section 2001 transfers the synthesized γ characteristic data to the γ correcting section 2002.

The γ correcting section 2002 performs a γ correction process for the image signal transferred from the γ characteristic data synthesizing section 2001, by using the γ characteristic data transferred from the γ characteristic data synthesizing section 2001.

The γ correcting section 2002 further extracts the high/low luminance determination result from the RAM 1005, and determines whether or not at least one of the high luminance image signal and the low luminance image signal exists, based on the control by the controlling section 111. Then, if the γ correcting section 2002 has determined that at least one of the high luminance image signal and the low luminance image signal exists, the γ correcting section 2002 transfers the processed image signal to the synthesizing section 1004. On the other hand, if the γ correcting section 2002 has determined that both the high luminance image signal and the low luminance image signal do not exist, the γ correcting section 2002 transfers the processed image signal to the color shift reducing section 208.

The synthesizing section 1004 performs the image synthesis process by using the image after the space-variant tone conversion process (first image signal) which has been transferred from the first tone correcting section 1002 and the image after the space-invariant tone conversion process (second image signal) which has been transferred from the second tone correcting section 1103, and transfers the synthesized image signal to the color shift reducing section 208.

Here, since a more detailed configuration of the synthesizing section 1004 is similar to FIG. 7 in the above described Embodiment 1, the synthesizing section 1004 of the present embodiment will be described with reference to the FIG. 7.

Figure 19:
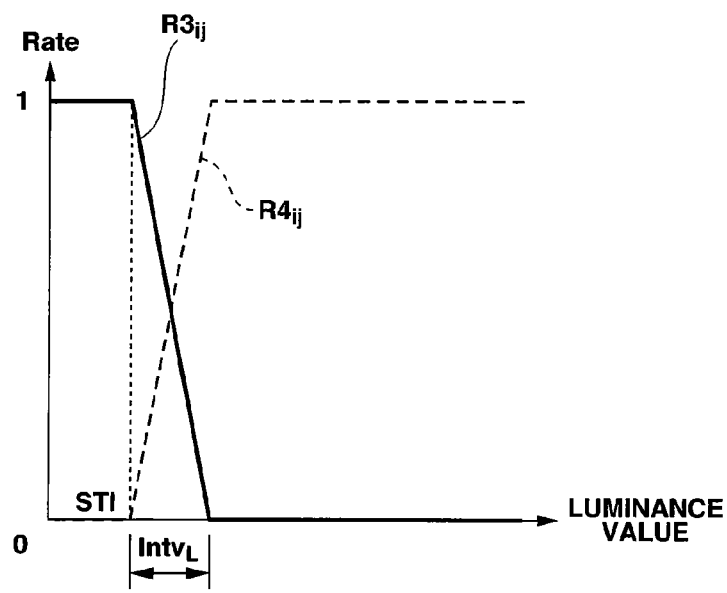
FIG. 19 is a diagram showing an example of setting the synthesis rates in a case where only the low luminance image signal exists in the above described Embodiment 2.
Figure 20:
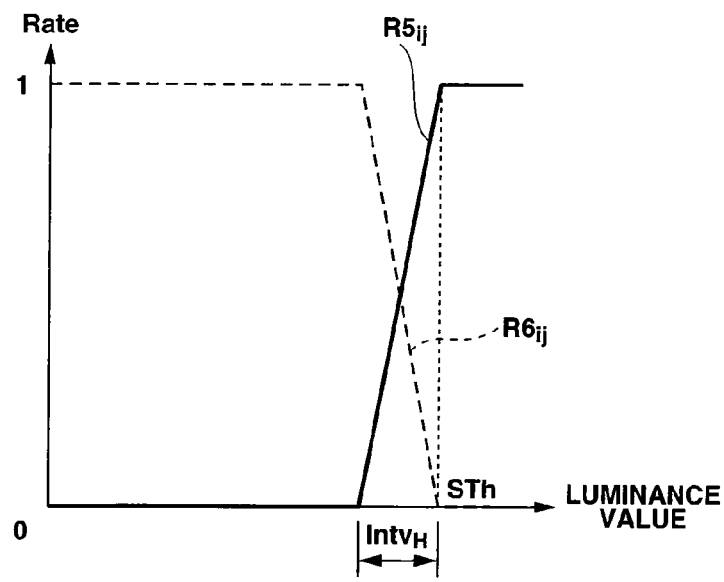
FIG. 20 is a diagram showing an example of setting the synthesis rates in a case where only the high luminance image signal exists in the above described Embodiment 2.

In the present embodiment, not only the high luminance region but also the low luminance region is detected. Therefore, the synthesizing section 1004 sets the variable synthesis rates at the time of synthesizing the first image signal and the second image signal, depending on the luminance value, for each pixel, based on the high luminance threshold STh and the low luminance threshold STl, as shown in FIGS. 18 to 20.

In other words, the synthesis rate setting section 903 first extracts the high/low luminance determination result from the RAM 1005. Then, if the extracted high/low luminance determination result indicates that both the high luminance image signal and the low luminance image signal exist, the synthesis rate setting section 903 further extracts the high luminance threshold STh and the low luminance threshold STl from the RAM 1005, and variably sets the synthesis rates as shown in FIG. 18.

Figure 18:
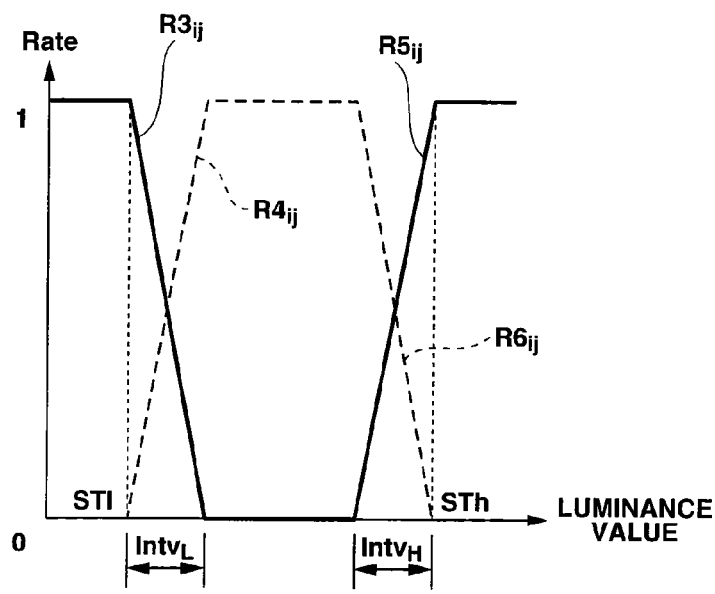
FIG. 18 is a diagram showing an example of setting the synthesis rates in a case where both a high luminance image signal and a low luminance image signal exist in the above described Embodiment 2.

Here, FIG. 18 is a diagram showing an example of setting the synthesis rates in a case where both the high luminance image signal and the low luminance image signal exist. In the FIG. 18, a solid line indicates a synthesis rate of a space-variant tone-processed image (first image signal), and a dotted line indicates a synthesis rate of a space-invariant tone-processed image (second image signal), respectively.

In the example shown in the FIG. 18, in both a case where the image signal is smaller than the low luminance threshold STl, and a case where the image signal is larger than the high luminance threshold STh, the synthesis rate of the first image signal is set to 1, and also, the synthesis rate of the second image signal is set to 0.

On the other hand, if an image signal value is larger than or equal to the low luminance threshold STl and less than or equal to the high luminance threshold STh, basically, the synthesis rate of the first image signal is set to 0, and also, the synthesis rate of the second image signal is set to 1. However, in order to prevent a drastic change of a tone conversion scheme at the low luminance threshold STl and the high luminance threshold STh, a relaxation region having a relaxation width IntvL is provided on a low luminance side, and a relaxation region having a relaxation width IntvH is provided on a high luminance side, respectively, so that the space-variant tone-processed image and the space-invariant tone-processed image continuously change and no failure occurs in terms of image quality.

In other words, the synthesis rate setting section 903 extracts predetermined data of the relaxation width IntvL which has been previously saved in the ROM 110, from the above described ROM 110. Based on the luminance value Pij, in the relaxation region having the relaxation width IntvL, the synthesis rate setting section 903 sets a synthesis rate R3$ij$ of the first image signal as shown in Equation 13, and moreover, sets a synthesis rate R4$ij$ of the second image signal as shown in Equation 14, respectively by linear interpolation.

$$R3ij=\{IntvL-(Pij-STl)\}/IntvL \qquad \text{[Equation 13]}$$

$$R4ij=1-R3ij \qquad \text{[Equation 14]}$$

Here, R3$ij$ shown in Equation 13 and R4$ij$ shown in Equation 14 are defined in a range of (STl+IntvL)>Pij≥STl. When Equation 14 is calculated, a conditional equation R3$ij$+R4$ij$=1 is used.

Furthermore, the synthesis rate setting section 903 extracts predetermined data of the relaxation width IntvH which has been previously saved in the ROM 110, from the above described ROM 110. Based on the luminance value Pij, in the relaxation region having the relaxation width IntvH, the synthesis rate setting section 903 sets a synthesis rate R5$ij$ of the first image signal as shown in Equation 15, and moreover, sets a synthesis rate R6$ij$ of the second image signal as shown in Equation 16, respectively by the linear interpolation.

$$R5ij=\{(Pij-STh+IntvH)/IntvH\} \qquad \text{[Equation 15]}$$

$$R6ij=1-R5ij \qquad \text{[Equation 16]}$$

Here, R5$ij$ shown in Equation 15 and R6$ij$ shown in Equation 16 are defined in a range of STh≥Pij>(STh−IntvH). When Equation 16 is calculated, a conditional equation R5$ij$+R6$ij$=1 is used.

It should be noted that, as the premise of the calculation of the above Equation 13 to Equation 16, it is assumed that a conditional expression (STh−IntvH)>(STl+IntvL) has been naturally established.

Then, in a region of (STl+IntvL)≤Pij≤(STh−IntvH), the synthesis rate of the first image signal is set to 0, and the synthesis rate of the second image signal is set to 1, respectively.

Here, it is not limited to use fixed values for the data of the relaxation widths IntvL and IntvH. The user may be able to freely perform the setting via the external I/F section 112, or the user may designate desired relaxation width data from a plurality of pieces of relaxation width data which have been previously prepared in the ROM 110, via the external I/F section 112.

Moreover, if the high/low luminance determination result extracted from the RAM 1005 indicates that only the low luminance image signal exists and the high luminance image signal does not exist, the synthesis rate setting section 903 extracts the low luminance threshold STl from the RAM 1005, and variably configures the variable synthesis rates as shown in FIG. 19.

Here, FIG. 19 is a diagram showing an example of setting the synthesis rates in a case where only the low luminance image signal exists. Also in the FIG. 19, the solid line indicates the synthesis rate of the space-variant tone-processed image (first image signal), and the dotted line indicates the synthesis rate of the space-invariant tone-processed image (second image signal), respectively.

In the example shown in the FIG. 19, if the luminance value Pij is smaller than the low luminance threshold STl, the synthesis rate of the first image signal is set to 1, and also, the synthesis rate of the second image signal is set to 0.

Moreover, in a region of (STl+IntvL)>Pij≥STl, the synthesis rate R3$ij$ of the first image signal is set as shown in Equation 13, and also, the synthesis rate R4$ij$ of the second image signal is set as shown in Equation 14.

Furthermore, in a region of Pij≥(STl+IntvL), the synthesis rate of the first image signal is set to 0, and also, the synthesis rate of the second image signal is set to 1.

Then, if the high/low luminance determination result extracted from the RAM 1005 indicates that only the high luminance image signal exists and the low luminance image signal does not exist, the synthesis rate setting section 903 extracts the high luminance threshold STh from the RAM 1005, and variably configures the variable synthesis rates as shown in FIG. 20.

Here, FIG. 20 is a diagram showing an example of setting the synthesis rates in a case where only the high luminance image signal exists. Also in the FIG. 20, the solid line indicates the synthesis rate of the space-variant tone-processed image (first image signal), and the dotted line indicates the synthesis rate of the space-invariant tone-processed image (second image signal), respectively.

In the example shown in the FIG. 20, if the luminance value Pij is larger than the high luminance threshold STh, the synthesis rate of the first image signal is set to 1, and also, the synthesis rate of the second image signal is set to 0.

Moreover, in a region of STh≥Pij>(STh−IntvH), the synthesis rate R5$ij$ of the first image signal is set as shown in Equation 15, and also, the synthesis rate R6$ij$ of the second image signal is set as shown in Equation 16.

Furthermore, in a region of Pij≤(STh−IntvH), the synthesis rate of the first image signal is set to 0, and also, the synthesis rate of the second image signal is set to 1.

It should be noted that, in the above description, although the example of variably setting the synthesis rates by the synthesis rate setting section 903 has been described, the fixed synthesis rates may be used similarly to the above described Embodiment 1. Then, fixed values stored in the ROM 110 may be used, or the user may be able to designate the synthesis rates. In the latter case, the user may be able to freely set the synthesis rates via the external I/F section 112, or the setting may be performed by previously storing the plurality of pairs of the synthesis rates in the ROM 110 and designating one pair of the plurality of pairs of the synthesis rates by the user via the external I/F section 112. In such a case, there is the advantage in that it becomes easy to artificially control the tone improvement effect due to the usage of the space-variant tone conversion process.

The synthesis rate setting section 903 transfers synthesis rate data set as described above, and the image signal from the buffer section 902, to the blending section 904.

The blending section 904 synthesizes the first image signal and the second image signal for each pixel, for example, based on Equation 10, as described above. Then, the blending section 904 transfers the synthesized image signal to the color shift reducing section 208, based on the control by the controlling section 111.

Figure 21:
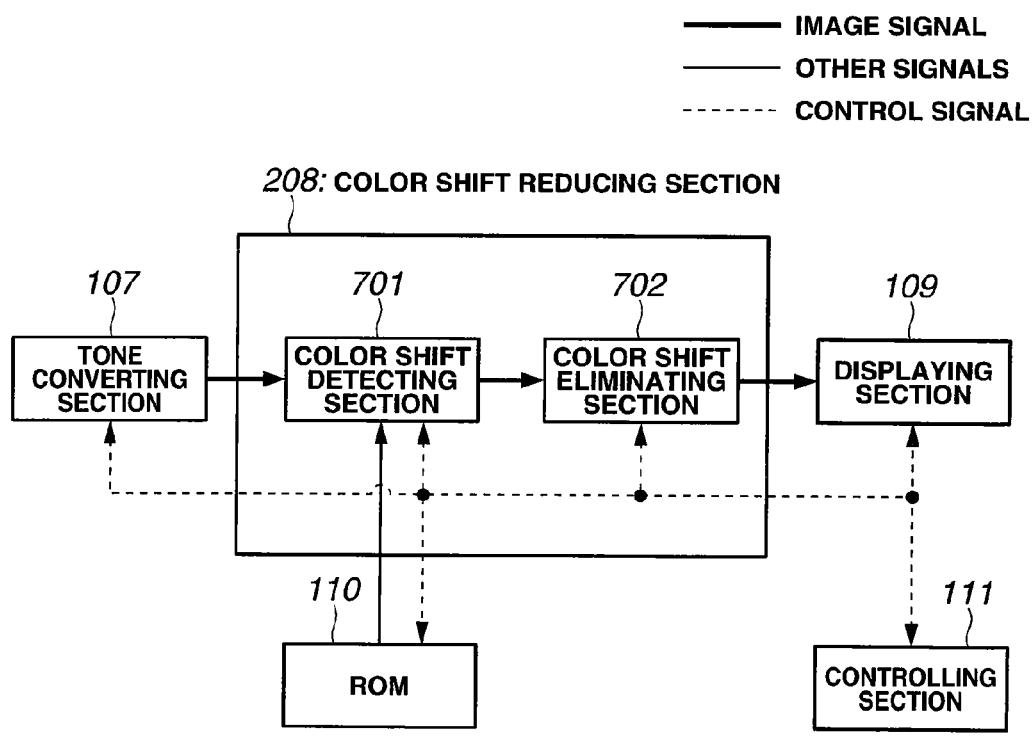
FIG. 21 is a block diagram showing an example of a configuration of a color shift reducing section in the above described Embodiment 2.

The color shift reducing section 208 performs a known color shift reduction process (color shift correction process) for the image signal transferred from the synthesizing section 1004 or the second tone correcting section 1103. FIG. 21 is a block diagram showing an example of a configuration of the color shift reducing section 208.

The color shift reducing section 208 is configured to have a color shift detecting section 701 which is the image quality degradation information obtaining means and color shift detecting means, and a color shift eliminating section 702 which is the image quality correcting means and color shift correcting means.

The tone converting section 107 is connected to the displaying section 109 via the color shift detecting section 701 and the color shift eliminating section 702. The ROM 110 is connected to the color shift detecting section 701.

The controlling section 111 is bidirectionally connected to the color shift detecting section 701 and the color shift eliminating section 702, so as to control the sections.

The color shift detecting section 701 converts the RGB image signal transferred from the synthesizing section 1004 or the second tone correcting section 1103 in the tone converting section 107, for example, into a YCrCb signal. Then, the color shift detecting section 701 calculates a chroma suppression gain with respect to a luminance signal Y.

Then, the color shift detecting section 701 transfers the luminance signal Y, a color-difference signal CrCb, and the calculated chroma suppression gain to the color shift eliminating section 702.

The color shift eliminating section 702 uses the chroma suppression gain to perform a chroma suppression process with respect to the color-difference signal CrCb, and converts the luminance signal Y and the color-difference signal CrCb after the chroma suppression process, into the RGB signal again. Since such a color shift reduction process is performed, a color shift which has occurred due to the tone conversion, or a color shift which has occurred due to the synthesis of the result of the space-variant tone conversion and the result of the space-invariant tone conversion, can be reduced.

Subsequently, the color shift eliminating section 702 transfers the image signal after the color shift reduction, to the displaying section 109.

It should be noted that, as means for improving image quality degradation of the image signal, the example of the noise reduction has been given in the above described Embodiment 1, and the example of the color shift reduction has been given in the Embodiment 2, which, however, are not restrictive. For example, if the image is a moving image, discontinuity may occur between frames, and may be observed as flickering of the moving image. In order to deal with such a point, for example, a known flickering reduction process as shown in the following Equation 17 may be performed.

$$Q'ij = Qij \times V1 + Qbij \times V2 + Qfij \times V3 \qquad \text{[Equation 17]}$$

In the Equation 17, Qij is the luminance value at the pixel position (i, j) in a target image signal, Qbij is the luminance value at the pixel position (i, j) in a previous frame image signal, Qfij is the luminance value at the pixel position (i, j) in a subsequent frame image signal, and Q'ij is the luminance value at the pixel position (i, j) in the synthesized image signal. V1 is the synthesis rate for Qij, V2 is the synthesis rate for Qbij, and V3 is the synthesis rate for Qfij, which are the synthesis rates satisfying a conditional equation for normalization, V1+V2+V3=1.

It should be noted that, also in the present embodiment, similarly to the above described Embodiment 1, the image signal processing apparatus in which the image pickup section is separated is also possible, the image signal processing method is also possible, and similar processes may be performed by causing a computer to execute the image signal processing program.

Figure 22:
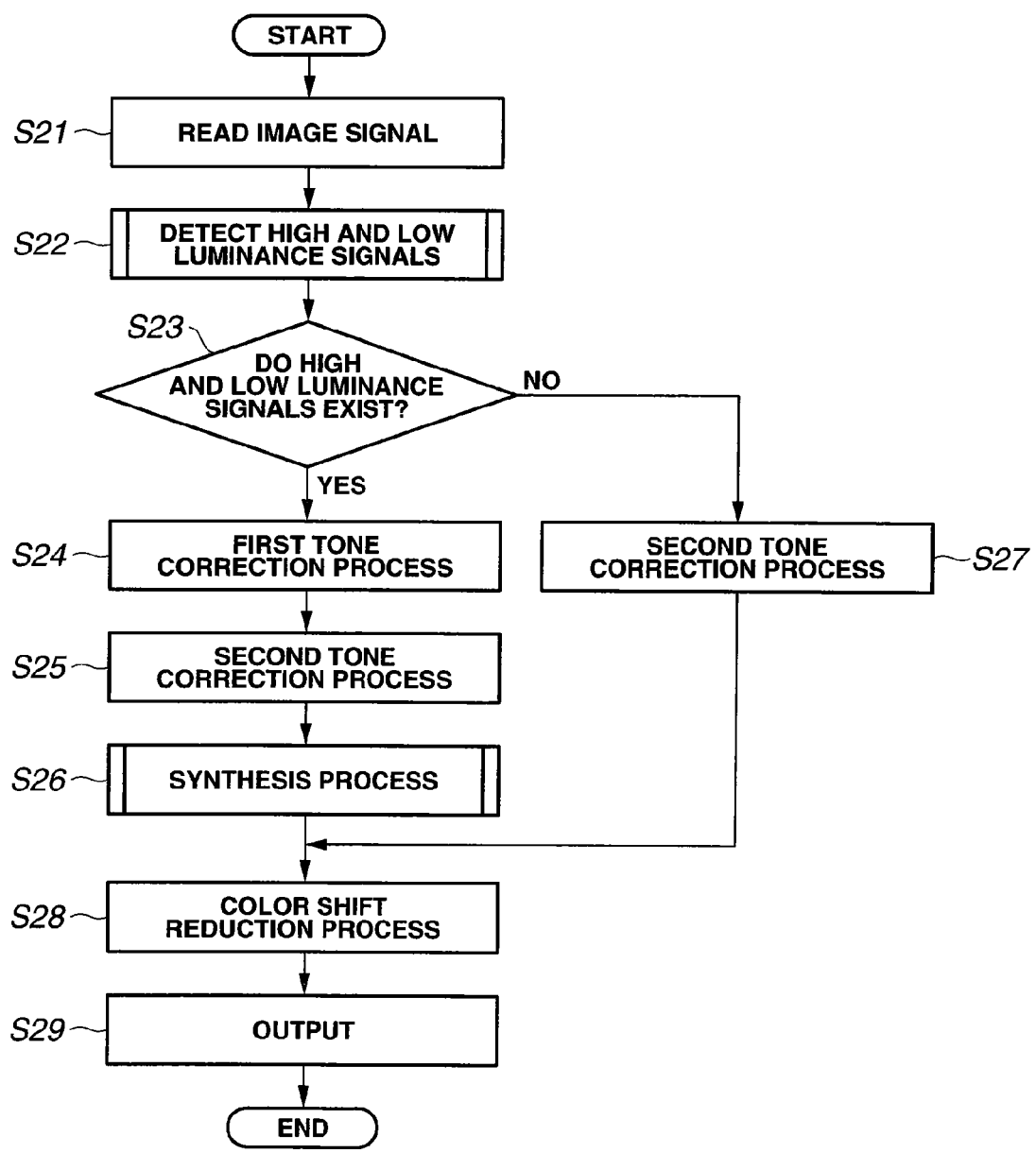
FIG. 22 is a flowchart showing a process by the image signal processing program in the above described Embodiment 2.

FIG. 22 is a flowchart showing the process by the image signal processing program.

When the process is started, first, the image signal, the above described header information and the like are read, and also, the information on the γ characteristic data (picture generation γ characteristic data) appropriate for the image processing and the γ characteristic data appropriate for displaying the image by the predetermined displaying apparatus and the like, which has been previously provided in the above described image signal processing program, is read (step S21). The process corresponds to the process for shooting the subject and obtaining the image signal in the image signal processing apparatus which is the image pickup apparatus.

Next, it is detected whether or not the high luminance image signal exists and whether or not the low luminance image signal exists, in the read image signal (step S22). The process corresponds to the process performed by the above described specific luminance region detecting section 402.

Subsequently, based on a result of the detection in step S22, it is determined whether or not at least one of the high luminance image signal and the low luminance image signal exists in the image signal (step S23). The process corresponds to the process performed by the tone converting section 107 and the controlling section 111.

Here, if it has been determined that at least one of the high luminance image signal and the low luminance image signal exists, the first tone correction process which is space-variant is performed for the image signal (step S24). The process corresponds to the process performed by the first tone correcting section 1002.

Subsequently, the γ characteristic data (picture generation γ characteristic data) appropriate for the image processing and the γ characteristic data appropriate for displaying the image by the predetermined displaying apparatus, which have been read in step S21, are synthesized, and the second tone correction process which is space-invariant is performed for the image signal by using the synthesized γ characteristic data (step S25). The process corresponds to the process performed by the second tone correcting section 1103.

It should be noted that, here, the first tone correction process is performed first and subsequently the second tone correction process is performed, which, however, may be in the reverse order thereof, or the first tone correction process and the second tone correction process may be simultaneously performed in parallel.

Then, the first image signal obtained in step S24 and the second image signal obtained in step S25 are synthesized (step S26). The process corresponds to the process performed by the synthesizing section 1004.

Moreover, if it has been determined in step S23 that both the high luminance image signal and the low luminance image signal do not exist, the γ characteristic data (picture generation γ characteristic data) appropriate for the image processing and the γ characteristic data appropriate for displaying the image by the predetermined displaying apparatus, which have been read in step S21, are synthesized, and the second tone correction process which is space-invariant is performed for the image signal by using the synthesized γ characteristic data (step S27). The process also corresponds to the process performed by the second tone correcting section 1103, similarly to the process in step S25.

When the process in step S26 or the process in step S27 is completed, the known color shift reduction process is performed (step S28). The process corresponds to the process performed by the color shift reducing section 208.

Subsequently, after the image signal after the color shift reduction is outputted, and displayed on the displaying apparatus, or stored in the memory card or the like (step S29), the process is completed.

Figure 23:
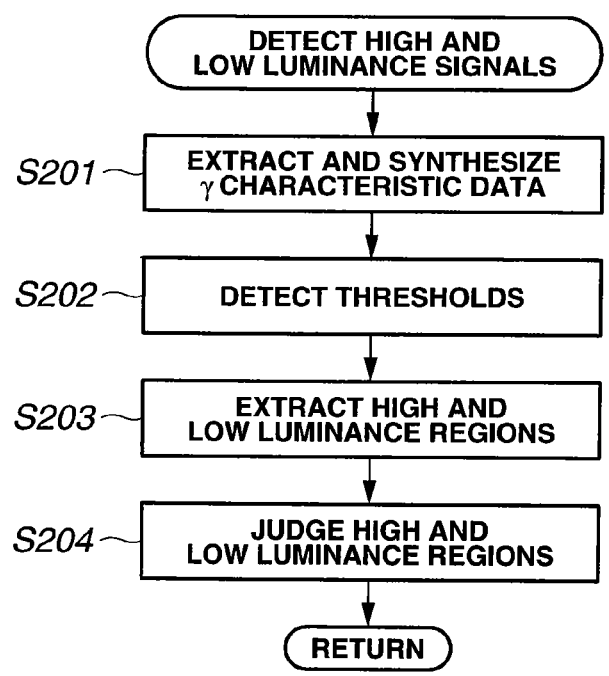
FIG. 23 is a flowchart showing details of a high/low luminance signal detection process in step S22 of FIG. 22, in the above described Embodiment 2.

Next, FIG. 23 is a flowchart showing details of the high/low luminance signal detection process in step S22 of FIG. 22.

When the process is started, first, the γ characteristic data (picture generation γ characteristic data) appropriate for the image processing and the γ characteristic data appropriate for displaying the image by the predetermined displaying apparatus are synthesized (step S201). The process corresponds to the process performed by the γ characteristic data extracting/synthesizing section 4121.

Next, as shown in FIG. 17, the input level at the time when the slope angle ΔH (Equation 11) corresponding to the synthesized γ characteristic data has first become smaller than the predetermined angle ΔHTH recognized as the whiteout is set as the high luminance threshold (STh shown in FIG. 8), and also, the input level at the time when the slope ΔL (Equation 12) corresponding to the synthesized γ characteristic data has first become smaller than the predetermined angle ΔLTH recognized as the blackout is set as the low luminance threshold (STl shown in FIG. 8) (step S202). The process corresponds to the process performed by the high/low luminance region threshold detecting section 4122.

Subsequently, the luminance values of all the pixels included in the image are compared with the high luminance threshold, and the number of pixels with the luminance value larger than the high luminance threshold (the pixels determined as the high luminance image signal) is counted. Also, the luminance values of all the pixels included in the image are compared with the low luminance threshold, and the number of pixels with the luminance value smaller than the low luminance threshold (the pixels determined as the low luminance image signal) is counted (step S203).

Then, the count number of the high luminance image signal is compared with the predetermined threshold (high luminance image signal threshold). If the count number of the high luminance image signal is larger than the predetermined threshold, it is judged that the high luminance image signal exists in the image. If the count number of the high luminance image signal is smaller than the predetermined threshold, it is judged that the high luminance image signal does not exist in the image. Also, the count number of the low luminance image signal is compared with the predetermined threshold (low luminance image signal threshold). If the count number of the low luminance image signal is larger than the predetermined threshold, it is judged that the low luminance image signal exists in the image. If the count number of the low luminance image signal is smaller than the predetermined threshold, it is judged that the low luminance image signal does not exist in the image (step S204). The processes in step S203 and step S204 correspond to the process performed by the high/low luminance region judging section 4123.

When the process in step S204 is completed, subsequently, the process returns to the process shown in FIG. 22.

It should be noted that, although an example of automatically setting the high luminance threshold and the low luminance threshold has been described here, the setting may be manually performed by a user input. Then, instead of the processes in step S201 and step S202 of FIG. 23, a process for manually inputting the high luminance threshold and the low luminance threshold may be performed.

According to Embodiment 2 as described above, effects almost similar to those of the above described Embodiment 1 are provided. Also, if at least one of the high luminance signal and the low luminance signal exists, for the original image signal, the space-variant tone conversion process is performed for each zone (for each pixel or for each pixel region). Therefore, the tone characteristic of the pixel or the pixel region belonging to the high luminance region or the low luminance region is retained without being compressed. Moreover, if both the high luminance signal and the low luminance signal do not exist, only the space-invariant tone conversion process is performed. Therefore, the power consumption can be reduced and the processes can be accelerated.

Furthermore, for the high luminance region in the image signal, the result of the space-variant tone conversion process corresponding to the above described high luminance region is substantially used, and for the low luminance region in the image signal, the result of the space-variant tone conversion process corresponding to the above described low luminance region is substantially used. However, for regions other than the high luminance region and the low luminance region, the result of synthesizing the space-variant tone-converted image and the space-invariant tone-converted image is used. Therefore, the tone in the high luminance region and the low luminance region is retained, and simultaneously, the tone in the middle luminance region is extended, and the image in which the tone reproduction characteristic has been reflected can be obtained.

It should be noted that the present invention is not directly limited to the above described embodiments, and in a practical phase, a constituent element can be varied and embodied within a range not deviating from the gist thereof. Moreover, an appropriate combination of a plurality of constituent elements disclosed in the above described embodiments can form various inventions. For example, several constituent elements may be deleted from all constituent elements shown in the embodiments. Furthermore, constituent elements across different embodiments may be combined as appropriate. As described above, of course, various variations or applications are possible within the range not deviating from the gist of the invention.

What is claimed is:

1. An image signal processing apparatus for performing an image signal process for a digitalized image signal from an image pickup device, comprising:
   a first tone conversion processing section for generating a first image signal by performing a space-variant tone conversion process for the image signal;
   a second tone conversion processing section for generating a second image signal by performing a space-invariant tone correction process for the image signal; and
   a synthesizing section for synthesizing the first image signal and the second image signal,
   wherein the space-variant tone conversion process is a process for deciding tone conversion characteristics variant among pixels or regions of the image signal, and performing a tone conversion for the pixels or the regions by using the tone conversion characteristics variant among the pixels or the regions, and
   wherein the space-invariant tone conversion process is a process for performing a tone conversion for the image signal by using a fixed tone conversion characteristic independent of the pixels or the regions, without deciding tone conversion characteristics variant among the pixels or the regions.

2. The image signal processing apparatus according to claim 1, wherein the synthesizing means is configured to have synthesis rate setting means for setting synthesis rates of the first image signal and the second image signal, and
   the synthesizing means synthesizes the first image signal and the second image signal by using the synthesis rates.

3. The image signal processing apparatus according to claim 2, wherein the synthesis rate setting means sets the synthesis rates to constant values for all pixels in the image signal.

4. The image signal processing apparatus according to claim 2, wherein the synthesis rate setting means sets the synthesis rates for each zone of an image represented by the image signal.

5. The image signal processing apparatus according to claim 4, wherein the synthesis rate setting means further sets the synthesis rates depending on a luminance value of the image signal, and for the synthesis rate of the first image signal, performs the setting so that a synthesis rate corresponding to a high luminance region becomes larger than a synthesis rate corresponding to a luminance region other than the high luminance region.

6. The image signal processing apparatus according to claim 4, wherein the synthesis rate setting means further sets the synthesis rates depending on a luminance value of the image signal, and for the synthesis rate of the first image signal, performs the setting so that a synthesis rate corresponding to a low luminance region becomes larger than a synthesis rate corresponding to a luminance region other than the low luminance region.

7. The image signal processing apparatus according to claim 4, wherein the synthesis rate setting means further sets the synthesis rates depending on a luminance value of the image signal, and for the synthesis rate of the first image signal, performs the setting so that a synthesis rate corresponding to a high luminance region becomes larger than a synthesis rate corresponding to a luminance region other than the high luminance region and a low luminance region, and performs the setting so that a synthesis rate corresponding to the low luminance region becomes larger than the synthesis rate corresponding to the luminance region other than the high luminance region and the low luminance region.

8. The image signal processing apparatus according to claim 3, wherein the synthesis rate setting means is configured to have:
   threshold setting means for setting a threshold for judging a specific luminance region in the image signal;
   specific luminance region detecting means for detecting the specific luminance region based on the threshold; and
   synthesis rate calculating means for calculating the synthesis rates based on a result of the detection by the specific luminance region detecting means.

9. The image signal processing apparatus according to claim 8, wherein the threshold setting means is configured to have threshold inputting means for inputting the threshold, and sets the threshold based on the input from the threshold inputting means.

10. The image signal processing apparatus according to claim 8, wherein the threshold setting means sets the threshold based on γ characteristic data used when the space-invariant tone conversion process is performed.

11. The image signal processing apparatus according to claim 10, wherein the γ characteristic data is any one of γ characteristic data appropriate for displaying an image by a displaying apparatus, γ characteristic data appropriate for image processing, and γ characteristic data obtained by synthesizing the γ characteristic data appropriate for displaying the image by the displaying apparatus and the γ characteristic data appropriate for the image processing.

12. The image signal processing apparatus according to claim 8, wherein the specific luminance region is a high luminance region and a low luminance region in the image signal, and
   the threshold setting means sets a high luminance threshold STh for judging the high luminance region, and a low luminance threshold STl for judging the low luminance region, which is smaller than the high luminance threshold STh.

13. The image signal processing apparatus according to claim 4, wherein the synthesis rate setting means is configured to have:
   threshold setting means for setting a threshold for judging a specific luminance region in the image signal;
   specific luminance region detecting means for detecting the specific luminance region based on the threshold; and
   synthesis rate calculating means for calculating the synthesis rates based on a result of the detection by the specific luminance region detecting means.

14. The image signal processing apparatus according to claim 13, wherein the threshold setting means is configured to have threshold inputting means for inputting the threshold, and sets the threshold based on the input from the threshold inputting means.

15. The image signal processing apparatus according to claim 13, wherein the threshold setting means sets the threshold based on γ characteristic data used when the space-invariant tone conversion process is performed.

16. The image signal processing apparatus according to claim 15, wherein the γ characteristic data is any one of γ characteristic data appropriate for displaying an image by a displaying apparatus, γ characteristic data appropriate for image processing, and γ characteristic data obtained by synthesizing the γ characteristic data appropriate for displaying the image by the displaying apparatus and the γ characteristic data appropriate for the image processing.

17. The image signal processing apparatus according to claim 13, wherein the specific luminance region is a high luminance region and a low luminance region in the image signal, and the threshold setting means sets a high luminance threshold STh for judging the high luminance region, and a low luminance threshold STl for judging the low luminance region, which is smaller than the high luminance threshold STh.

18. The image signal processing apparatus according to claim 1, further comprising:

image quality degradation information obtaining means for obtaining image quality degradation information from the image signal synthesized by the synthesizing means; and image quality correcting means for correcting the image signal synthesized by the synthesizing means, based on the image quality degradation information.

19. The image signal processing apparatus according to claim 18, wherein the image quality degradation information obtaining means is configured to have noise detecting means for detecting a noise level of the image signal synthesized by the synthesizing means, and the image quality correcting means is configured to have noise reducing means for performing a noise reduction process for the image signal synthesized by the synthesizing means.

20. The image signal processing apparatus according to claim 18, wherein the image quality degradation information obtaining means is configured to have color shift detecting means for detecting a color shift in the image signal synthesized by the synthesizing means, and the image quality correcting means is configured to have color shift correcting means for performing a color shift correction process for the image signal synthesized by the synthesizing means.

21. A non-transitory computer-readable recording medium recording an image signal processing program for performing an image signal process for a digitalized image signal from an image pickup device, the image signal processing program comprising:

a first tone conversion processing step of generating a first image signal by performing a space-variant tone conversion process for the image signal;

a second tone conversion processing step of generating a second image signal by performing a space-invariant tone correction process for the image signal; and a synthesizing step of synthesizing the first image signal and the second image signal.

22. The non-transitory computer-readable recording medium recording the image signal processing program according to claim 21, wherein the synthesizing step includes a synthesis rate setting step of setting synthesis rates of the first image signal and the second image signal, and the synthesizing step is a step of synthesizing the first image signal and the second image signal by using the synthesis rates.

* * * * *